US012566646B2

(12) United States Patent
Zheng et al.

(10) Patent No.: US 12,566,646 B2
(45) Date of Patent: Mar. 3, 2026

(54) ACCESSING CRITICAL RESOURCE IN A NON-UNIFORM MEMORY ACCESS (NUMA) SYSTEM

(71) Applicant: HUAWEI TECHNOLOGIES CO., LTD., Shenzhen (CN)

(72) Inventors: Chengguang Zheng, Shanghai (CN); Minqi Zhou, Shanghai (CN); Tong Yuan, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1020 days.

(21) Appl. No.: 17/587,663

(22) Filed: Jan. 28, 2022

(65) Prior Publication Data

US 2022/0147404 A1 May 12, 2022

Related U.S. Application Data

(63) Continuation of application No. PCT/CN2020/103924, filed on Jul. 24, 2020.

(30) Foreign Application Priority Data

Jul. 29, 2019 (CN) ......................... 201910690999.X

(51) Int. Cl.
G06F 9/52 (2006.01)
G06F 9/48 (2006.01)
G06F 9/50 (2006.01)

(52) U.S. Cl.
CPC ............ G06F 9/526 (2013.01); G06F 9/4881 (2013.01); G06F 9/5033 (2013.01)

(58) Field of Classification Search
CPC ...... G06F 9/526; G06F 9/4881; G06F 9/5033; G06F 9/5016
See application file for complete search history.

(56) References Cited

U.S. PATENT DOCUMENTS 5,612,865 A * 3/1997 Dasgupta .................. G06F 9/52
700/79
5,699,500 A * 12/1997 Dasgupta .................. G06F 9/52
714/1
(Continued)

FOREIGN PATENT DOCUMENTS

CN 101685408 A 3/2010
CN 104834505 A 8/2015
(Continued)

OTHER PUBLICATIONS

Hendler et al., "Flat Combining and the Synchronization-Parallelism Tradeoff," Proceedings of the 22nd Annual ACM Symposium on Parallelism in Algorithms and Architectures, Jun. 2010, 10 pages.

(Continued)

*Primary Examiner* — Benjamin C Wu
(74) *Attorney, Agent, or Firm* — Fish & Richardson P.C.

(57) ABSTRACT

A method and an apparatus for accessing a critical resource, a computer device, and a readable storage medium are provided, to help reduce a quantity of operations for contending for a lock by a thread, and computing resources, and improve performance of an ARM processor. The method for accessing a critical resource includes: selecting a first thread from the first thread and a second thread to contend for a target lock (201), where a first task to be executed by the first thread and a second task to be executed by the second thread correspond to the target lock; and if the first thread obtains the target lock through contention, enabling the first thread to execute the first task, and replace the second thread to execute the second task (202).

25 Claims, 13 Drawing Sheets

(56) References Cited

U.S. PATENT DOCUMENTS

| | | | | |
|---|---|---|---|---|
| 6,499,031 | B1 * | 12/2002 | Hopmann | G06F 21/6218 |
| | | | | 710/36 |
| 6,829,609 | B1 * | 12/2004 | Wagner | G06F 9/526 |
| 7,409,525 | B1 * | 8/2008 | Clark | G06F 12/1072 |
| | | | | 711/E12.066 |
| 7,509,448 | B2 * | 3/2009 | Fachan | G06F 9/526 |
| | | | | 718/107 |
| 7,774,645 | B1 * | 8/2010 | Clark | G06F 11/2076 |
| | | | | 714/13 |
| 7,844,973 | B1 * | 11/2010 | Dice | G06F 9/52 |
| | | | | 710/200 |
| 8,037,476 | B1 * | 10/2011 | Shavit | G06F 9/526 |
| | | | | 712/228 |
| 8,332,485 | B1 * | 12/2012 | Ben-Shaul | G06F 9/526 |
| | | | | 709/219 |
| 8,966,491 | B2 * | 2/2015 | Calciu | G06F 9/526 |
| | | | | 707/704 |
| 10,248,420 | B2 * | 4/2019 | Mukherjee | G06F 9/546 |
| 10,331,500 | B2 * | 6/2019 | Mukherjee | G06F 9/524 |
| 2004/0225742 | A1 * | 11/2004 | Loaiza | G06F 9/526 |
| | | | | 709/225 |
| 2006/0129556 | A1 * | 6/2006 | Reuter | G06F 9/526 |
| | | | | 710/200 |
| 2006/0224805 | A1 * | 10/2006 | Pruscino | G06F 9/526 |
| | | | | 710/200 |
| 2006/0225077 | A1 | 10/2006 | Anderson | |
| 2006/0248127 | A1 * | 11/2006 | Whitehouse | G06F 9/526 |
| | | | | 707/999.203 |
| 2008/0005112 | A1 * | 1/2008 | Shavit | G06F 9/526 |
| 2010/0121865 | A1 * | 5/2010 | Vaid | G06F 9/5066 |
| | | | | 707/E17.014 |
| 2010/0312850 | A1 * | 12/2010 | Deshpande | G06F 12/1009 |
| | | | | 709/216 |
| 2011/0106778 | A1 * | 5/2011 | Chan | G06F 16/2343 |
| | | | | 707/704 |
| 2012/0102501 | A1 * | 4/2012 | Waddington | G06F 9/5061 |
| | | | | 718/105 |
| 2013/0047011 | A1 * | 2/2013 | Dice | G06F 1/3228 |
| | | | | 713/320 |
| 2013/0290583 | A1 * | 10/2013 | Dice | G06F 9/526 |
| | | | | 710/200 |
| 2013/0290967 | A1 * | 10/2013 | Calciu | G06F 9/526 |
| | | | | 718/102 |
| 2014/0189039 | A1 * | 7/2014 | Dalton | G06F 11/3006 |
| | | | | 709/213 |
| 2015/0186057 | A1 * | 7/2015 | Das Sharma | G06F 9/467 |
| | | | | 711/153 |
| 2016/0098303 | A1 * | 4/2016 | Balakrishnan | G06F 9/52 |
| | | | | 718/102 |
| 2016/0224373 | A1 * | 8/2016 | Harris | G06F 9/5027 |
| 2017/0039094 | A1 * | 2/2017 | Dice | G06F 9/526 |
| 2017/0220474 | A1 * | 8/2017 | Dice | G06F 16/176 |
| 2018/0107514 | A1 * | 4/2018 | Dice | G06F 9/52 |
| 2018/0198731 | A1 * | 7/2018 | Krauss | H04L 67/1095 |
| 2019/0075084 | A1 * | 3/2019 | Ding | H04L 63/104 |
| 2019/0146845 | A1 * | 5/2019 | Shen | G06F 9/46 |
| | | | | 718/104 |
| 2020/0097335 | A1 * | 3/2020 | Kogan | G06F 9/52 |
| 2020/0319939 | A1 * | 10/2020 | Kim | G06F 9/526 |
| 2021/0103576 | A1 * | 4/2021 | Chan | G06F 16/2358 |
| 2023/0244604 | A1 * | 8/2023 | Chaudhary | G06F 12/0859 |
| | | | | 711/144 |

FOREIGN PATENT DOCUMENTS

| | | | |
|---|---|---|---|
| CN | 107077425 A | 8/2017 | |
| WO | WO-2017190594 A1 * | 11/2017 | H04L 63/0884 |

OTHER PUBLICATIONS

PCT International Search Report and Written Opinion issued in International Application No. PCT/CN2020/103924 on Oct. 27, 2020, 17 pages (with English translation).

* cited by examiner

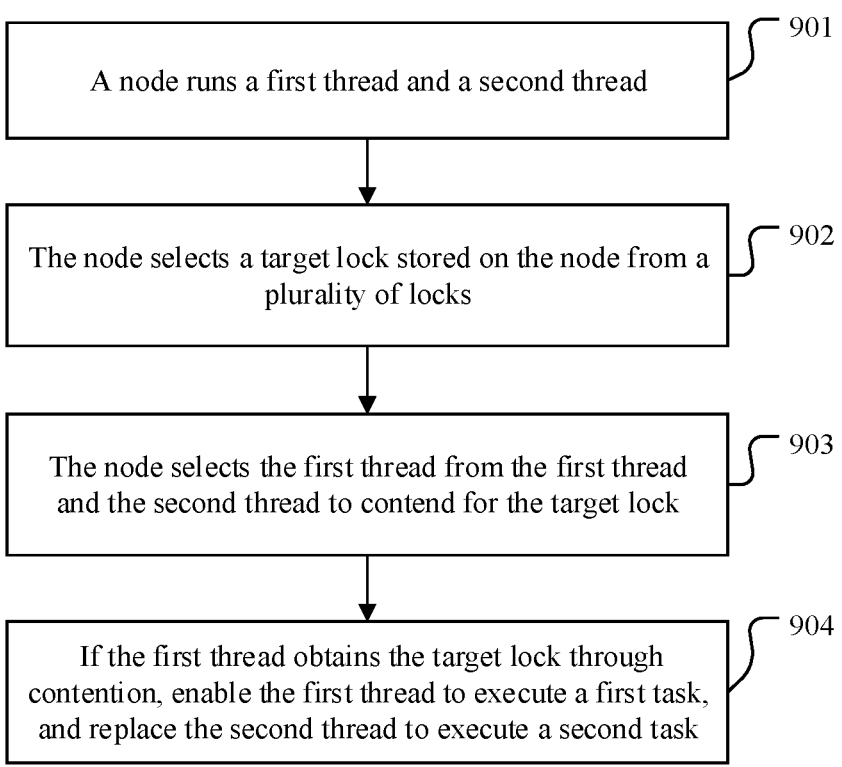

A node runs a first thread and a second thread          901

The node selects a target lock stored on the node from a plurality of locks          902

The node selects the first thread from the first thread and the second thread to contend for the target lock          903

If the first thread obtains the target lock through contention, enable the first thread to execute a first task, and replace the second thread to execute a second task          904

FIG. 9

ACCESSING CRITICAL RESOURCE IN A NON-UNIFORM MEMORY ACCESS (NUMA) SYSTEM

CROSS-REFERENCE TO RELATED APPLICATIONS

This application is a continuation of International Application No. PCT/CN2020/103924, filed on Jul. 24, 2020, which claims priority to Chinese Patent Application No. 201910690999.X, filed on Jul. 29, 2019. The disclosures of the aforementioned applications are hereby incorporated by reference in their entireties.

TECHNICAL FIELD

This application relates to the field of computer technologies, and in particular, to a method and an apparatus for accessing a critical resource, a computer device, and a computer-readable storage medium.

BACKGROUND

With development of chip technologies, multi-core processors have become more popular. To maximize potential of the multi-core processors, application programs are usually run in parallel in a multi-thread manner.

Some shared resources can be used by only one thread at a time. Such shared resources are referred to as critical resources. To avoid a conflict, a lock is usually set for a critical resource in a conventional technology. A plurality of threads to access a same critical resource need to contend for the lock of the critical resource, and only a thread that obtains the lock through contention can execute a task of accessing the critical resource. A thread that does not obtain the lock through contention needs to wait until the lock is unlocked, and contends for the lock again to execute a task of accessing the critical resource. If n threads need to execute the task of accessing the critical resource, at least n operations of contending for the lock are required.

An operation of contending for a lock needs to occupy a large quantity of computing resources. By using an existing method for accessing a critical resource, a large quantity of operations of contending for a lock are prone to be incurred, and a large amount of computing resources are consumed. Especially, for a processor of an advanced reduced instruction set machine (Advanced reduced instruction set machine, ARM) architecture that has a relatively low single-core processing capability and a relatively large quantity of processor cores, the existing method for accessing a critical resource greatly reduces performance of the processor.

SUMMARY

Embodiments of this application provide a method and an apparatus for accessing a critical resource, a computer device, and a readable storage medium, to reduce a resource consumed by an operation of contending for a lock, and improve system performance.

A first aspect of this application provides a method for accessing a critical resource. The method includes: selecting a first thread from the first thread and a second thread to contend for a target lock, where a first task to be executed by the first thread and a second task to be executed by the second thread correspond to the target lock; and if the first thread obtains the target lock through contention, enabling the first thread to execute the first task, and replace the second thread to execute the second task.

A conflict may occur when a plurality of tasks (for example, a plurality of tasks that access a same critical resource) are run simultaneously. To avoid the conflict, a lock mechanism is usually used to ensure that the plurality of tasks are executed in a mutually exclusive manner. A lock is a memory structure that maintains a lock variable. The lock variable may be a process-specific variable or a system-wide variable. A process in which a thread contends for a lock (in other words, a thread applies for a lock) is a process in which the thread attempts to occupy the lock (lock) by accessing a lock variable in the lock. If the lock is not occupied by another thread, the thread may occupy the lock (lock), that is, the thread obtains the lock through contention. After completing a task, the thread may unlock (unlock) the lock by accessing the lock variable in the lock. If the lock is occupied by another thread, the thread needs to wait for the lock to be unlocked and contends for the lock.

In the method for accessing a critical resource provided in this application, if n threads need to execute n tasks in the mutually exclusive manner, the n tasks can be completed by performing only one operation of contending for a lock. Compared with a conventional technology, this helps reduce a quantity of operations of contending for a lock and save computing resources. Although a single-core processing speed of an ARM processor is relatively low, and a quantity of threads running simultaneously is relatively large, performing the method provided in this embodiment of this application by the ARM processor helps save computing resources, and reduce impact of the operations of contending for a lock on performance of the ARM processor. It should be noted that although one operation of contending for a lock may correspond to execution of a plurality of tasks, because the plurality of tasks are executed by a single thread (that is, the first thread), it can be ensured that the plurality of tasks are not executed simultaneously.

With reference to the first aspect, in a first possible implementation of the first aspect, that the first thread replaces the second thread to execute the second task includes: The first thread executes the second task based on an identifier that is of the second task and that is recorded in a data structure. The first thread may execute the second task based on the identifier of the second task. For example, the identifier of the second task may refer to an address of the second task. Alternatively, the identifier of the second task may refer to an address of a thread descriptor of the second thread, and the thread descriptor of the second thread stores the second task or the address of the second task. When different tasks correspond to a same function, a thread may invoke a function of a same critical area when executing the different tasks. When the thread executes the different tasks, because content (referred to as task parameters) that is input to variables maintained in the critical area is different, the different tasks can be implemented. If the first task and the second task are tasks executed by using the function of the same critical area, the address of the second task may be specifically an address of a task parameter of the second task, and the first thread may enter the critical area of the first thread by using the task parameter of the second task to execute the second task. The first possible implementation of the first aspect provides a feasible implementation of the first aspect, and helps improve implementability of the method in the first aspect.

With reference to the first aspect or the first possible implementation of the first aspect, in a second possible implementation of the first aspect, the second thread is a thread that runs to the second task before the first thread obtains the target lock through contention. In other words, if the first thread obtains the target lock through contention, the first thread may replace a thread to execute a task of the thread, where the thread runs to a task corresponding to the target lock before the first thread runs to the task corresponding to the target lock.

With reference to the first aspect or the first possible implementation of the first aspect, in a third possible implementation of the first aspect, a moment at which the first thread runs to the first task is earlier than a moment at which the second thread runs to the second task. In other words, if the first thread obtains the target lock through contention, the first thread may replace a thread to execute a task of the thread, where the thread runs to a task corresponding to the target lock after the first thread runs to the first task corresponding to the target lock.

With reference to any one of the first aspect to the third possible implementation of the first aspect, in a fourth possible implementation of the first aspect, the method further includes blocking the second thread. Blocking a thread usually means that a thread is suspended during execution, to wait for being triggered under a condition. For example, blocking the second thread (or enabling the second thread to enter a blocking state) may be implemented by invoking a static sleep (sleep) method of the thread. In this case, the blocking state of the thread is specifically a sleep state of the thread, and the sleep thread does not occupy a processor, thereby saving computing resources. Alternatively, blocking the second thread (or enabling the second thread to enter a blocking state) may be implemented by spinning the thread. In this case, the blocking state of the thread specifically refers to spinning of the thread. The spinning thread occupies a processor, and cyclically determines whether the spinning thread satisfies an unblocking condition, and consequently, consumes computing resources.

With reference to the fourth possible implementation of the first aspect, in a fifth possible implementation of the first aspect, the method further includes: unblocking the second thread if the first thread replaces the second thread to complete execution of the second task. Unblocking a thread means to resume running of the thread after a cause for blocking the thread is eliminated.

With reference to any one of the first aspect to the fifth possible implementation of the first aspect, in a sixth possible implementation of the first aspect, the first thread and the second thread are threads running on a same target node of a NUMA system. The first task and the second task are used to access a buffer of the NUMA system. The buffer includes a plurality of buffer areas, and each buffer area corresponds to one lock. The NUMA system includes a plurality of nodes. Locks corresponding to the plurality of buffer areas are stored on the plurality of nodes in the NUMA system. The target lock is a lock stored on the target node. In this case, the first thread may contend for the target lock through local access. If the first thread obtains the target lock through contention, the first thread may access a buffer area corresponding to the target lock to execute the first task and the second task.

A second aspect of the embodiments of this application provides a method for accessing a critical resource in a NUMA system. The method includes: A node in the NUMA system runs a target thread. When the target thread runs to a target task, a target lock stored on the node is selected from a plurality of locks, where the target task is used to access a buffer of the NUMA system, the buffer includes a plurality of buffer areas, and each of the plurality of locks corresponds to one buffer area. The target thread is enabled to execute the target task if the target thread obtains the target lock through contention. When the target task to be executed by a thread is used to access the buffer of the NUMA system, the thread may select, from the plurality of locks, the lock stored on the node on which the lock is located for contention. In this case, in a process of contending for the lock, a probability of local access by the thread is increased, and efficiency of contending for the lock is improved, and further, efficiency of task execution is improved.

With reference to the second aspect, in a first possible implementation of the second aspect, the method further includes distributing the plurality of locks to a plurality of nodes in the NUMA system. This helps improve a probability that the thread selects the lock stored on the node on which the lock is located, and increase a probability that the thread contends for the lock through local access.

With reference to the second possible implementation of the second aspect, in a third possible implementation of the second aspect, the method further includes recording a correspondence between each of the plurality of locks and a node on which each lock is located. This helps select the locally stored target lock from the plurality of locks.

With reference to the third possible implementation of the second aspect, in a fourth possible implementation of the second aspect, selecting the target lock stored on the node from the plurality of locks includes: selecting the target lock from the plurality of locks based on the correspondence. The provided manner of selecting the target lock helps improve implementability of the method in the embodiments provided in the second aspect.

A third aspect of the embodiments of this application provides an apparatus for accessing a critical resource. The apparatus includes: a thread selection module, configured to select a first thread from the first thread and a second thread to contend for a target lock, where a first task to be executed by the first thread and a second task to be executed by the second thread correspond to the target lock; and a task execution module, configured to: if the first thread selected by the thread selection module obtains the target lock through contention, enable the first thread to execute the first task, and replace the second thread to execute the second task.

With reference to the third aspect, in a first possible implementation of the third aspect, the task execution module is specifically configured to enable the first thread to execute the second task based on an identifier that is of the second task and that is recorded in a data structure.

With reference to the third aspect or the first possible implementation of the third aspect, in a second possible implementation of the third aspect, the second thread is a thread that runs to the second task before the first thread obtains the target lock through contention.

With reference to the third aspect or the first possible implementation of the third aspect, in a third possible implementation of the third aspect, a moment at which the first thread runs to the first task is earlier than a moment at which the second thread runs to the second task.

With reference to the third aspect to the third possible implementation of the third aspect, in a fourth possible implementation of the third aspect, the apparatus further includes a blocking module, configured to block the second thread.

With reference to the fourth possible implementation of the third aspect, in a fifth possible implementation of the third aspect, the apparatus further includes an unblocking module, configured to unblock the second thread if the first thread replaces the second thread to complete execution of the second task.

With reference to the third aspect to the fifth possible implementation of the third aspect, in a sixth possible implementation of the third aspect, the first thread and the second thread are threads running on a same target node of a NUMA system. The first task and the second task are used to access a buffer of the NUMA system. The buffer includes a plurality of buffer areas, and each buffer area corresponds to one lock. The NUMA system includes a plurality of nodes. Locks corresponding to the plurality of buffer areas are stored on the nodes in the NUMA system. The target lock is stored on the target node.

For beneficial effects of each apparatus embodiment provided in the third aspect, refer to corresponding beneficial effects of each method embodiment provided in the first aspect. Details are not described herein again.

A fourth aspect of the embodiments of this application provides an apparatus for accessing a critical resource in a NUMA system. The apparatus is disposed on a node in the NUMA system. The apparatus includes: a running module, configured to run a target thread; a lock selection module, configured to: when the target thread runs a target task, select, from a plurality of locks, a target lock stored on the node, where the target task is used to access a buffer of the NUMA system, the buffer includes a plurality of buffer areas, and each of the plurality of locks corresponds to one buffer area; and a task execution module, configured to enable the target thread to execute the target task if the target thread obtains the target lock through contention.

With reference to the fourth aspect, in a first possible implementation of the fourth aspect, the apparatus further includes a lock distribution module, configured to distribute the plurality of locks to a plurality of nodes in the NUMA system.

With reference to the first possible implementation of the fourth aspect, in a second possible implementation of the fourth aspect, the apparatus further includes recording module, configured to record a correspondence between each of the plurality of locks and a node on which each lock is located.

With reference to the second possible implementation of the fourth aspect, in a third possible implementation of the fourth aspect, the lock selection module is specifically configured to select the target lock from the plurality of locks based on the correspondence.

For beneficial effects of each apparatus embodiment provided in the fourth aspect, refer to corresponding beneficial effects of each method embodiment provided in the second aspect. Details are not described herein again.

A fifth aspect of the embodiments of this application provides a computer device, including a processor and a memory. When running computer executable instructions stored in the memory, the processor performs the method according to any one of the first aspect or the possible implementations of the first aspect, or performs the method according to any one of the second aspect or the possible implementations of the second aspect.

When the processor runs the computer executable instructions stored in the memory to perform the method according to the sixth possible implementation of the first aspect or the method according to any one of the second aspect or the possible implementations of the second aspect, the computer device may be specifically a NUMA system. For example, the computer may be a NUMA-based server, or a node of the NUMA system.

A sixth aspect of the embodiments of this application provides a computer-readable storage medium, including instructions. When the instructions are run on a computer, the computer is enabled to perform the method according to any one of the first aspect or the possible implementations of the first aspect, or performs the method according to any one of the second aspect or the possible implementations of the second aspect.

BRIEF DESCRIPTION OF DRAWINGS

FIG. 9 is a schematic diagram of another embodiment of a method for accessing a critical resource in a NUMA system according to this application;

DESCRIPTION OF EMBODIMENTS

The following describes the embodiments of this application with reference to the accompanying drawings.

With development of chip technologies, computer devices with a multiprocessor core have become more popular. To maximize potential of the multiprocessor core, application programs are usually run in parallel in a multi-thread manner. But some tasks need to be executed in a mutually exclusive manner. A common practice is to set a same lock for the plurality of tasks that need to be executed in a mutually exclusive manner, and only a thread that obtains the lock through contention can execute a task of the thread.

The following uses an example in which tasks that need to be executed in a mutually exclusive manner are tasks that access a same critical resource.

Most computer devices with a multiprocessor core now provide shared resources for a plurality of threads. For example, a computer device with an SMP (symmetrical multi-processing architecture, symmetrical multi-processing architecture) or a NUMA (non-uniform memory access, non-uniform memory access) multiprocessor-core (multi-core) provides a unified physical memory address space, and a plurality of threads may access (perform a read operation or a write operation) a same memory address by using a shared variable. However, some shared resources need to be used in a mutually exclusive manner among threads, that is, the shared resources can be used by only one thread at a time. Such shared resources are referred to as critical resources, and a code segment accessing the critical resources is referred to as a critical area. To avoid a resource conflict, a processor core provides a plurality of synchronization mechanisms to protect a critical resource. For example, a lock is set for a critical area or the critical resource. When a task to be executed by a thread needs to access the critical resource, the thread needs to contend for a lock of the critical resource. The thread can enter the critical area and access the critical resource only after the thread obtains the lock through contention. A thread that does not obtain the lock through contention needs to wait for the lock to be unlocked to contend for the lock again.

Figure 1:
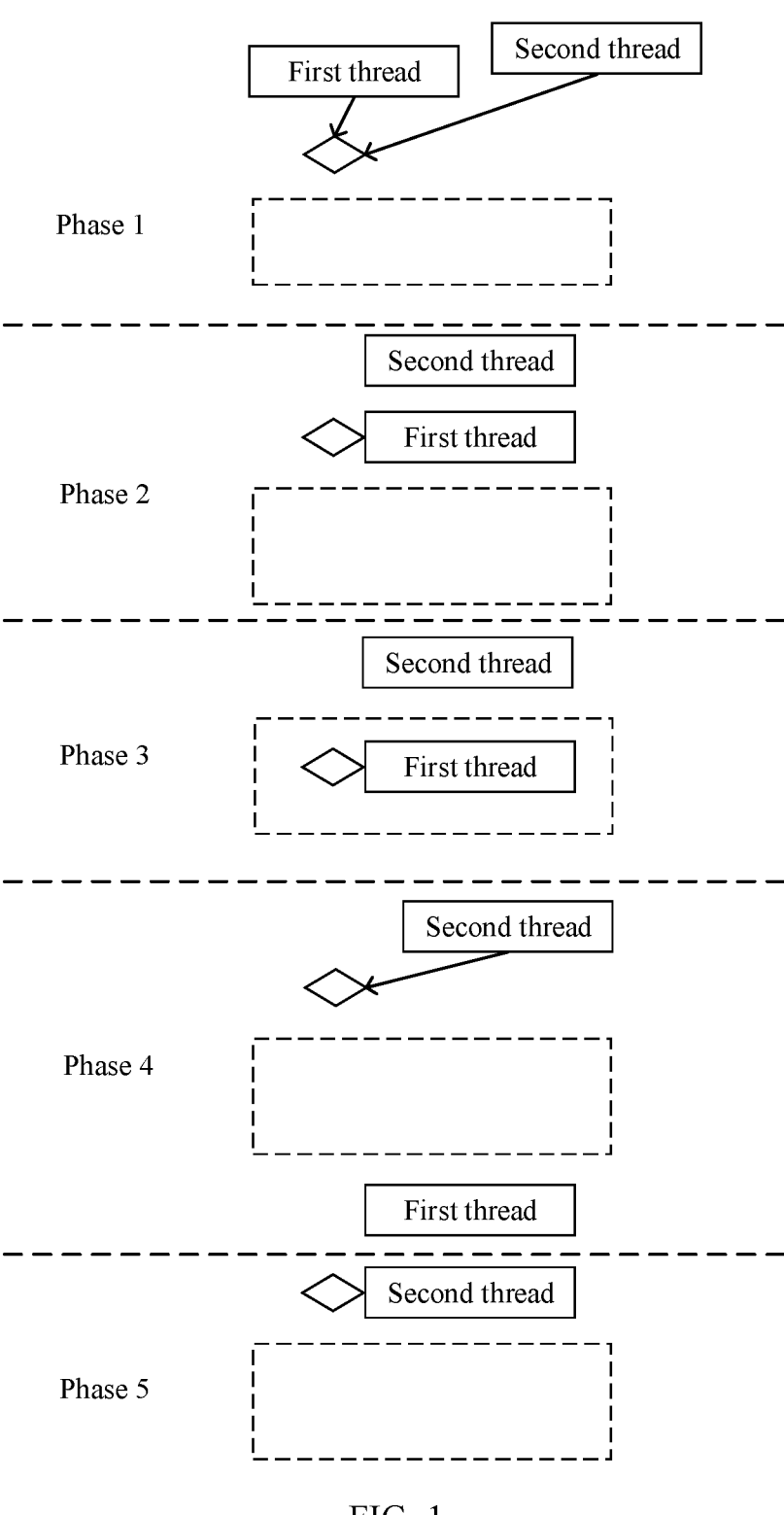
FIG. 1 is a schematic diagram of a process in which a plurality of threads access a same critical resource in a conventional technology.

FIG. 1 is a schematic diagram in which a plurality of threads access a same critical resource in a conventional technology. A rectangular block with dashed lines represents a critical area or a critical resource, and a diamond block represents a lock of the critical area or the critical resource. Refer to FIG. 1. A process in which the plurality of threads access the same critical resource includes the following phases.

Phase 1: A task to be executed by a first thread and a task to be executed by a second thread need to access the critical resource, and the first thread and the second thread both contend for a lock of the critical resource.

Phase 2: The first thread obtains the lock through contention, and the second thread waits for the lock.

Phase 3: The first thread enters a critical area of the first thread, and executes the task of the first thread by using the critical resource; and the second thread continues waiting for the lock.

Phase 4: The first thread completes its task, exits the critical area, and unlocks the lock; and the second thread contends for the lock again.

Phase 5. The second thread obtains the lock through contention.

After phase 5, the second thread may enter a critical area of the second thread and execute the task of the second thread by using the critical resource. For subsequent steps performed by the second thread, refer to the steps performed by the first thread in phase 3 and phase 4. Details are not described herein again.

In an existing method for accessing a critical resource, after obtaining a lock through contention, a thread enters a critical area to execute a task of the thread. If n threads need to execute tasks by using a same critical resource, at least n operations of contending for the lock are required. Compared with an x86 processor, an ARM processor has a larger quantity of processor cores and more threads running simultaneously. Therefore, when performing the existing method for accessing a critical resource, the ARM processor needs to perform a large quantity of operations of contending for a lock, and a large quantity of computing resources are consumed. In addition, a single-core processing speed of the ARM processor is relatively low, and the large quantity of operations of contending for the lock greatly reduce performance of the ARM processor.

Figure 2:
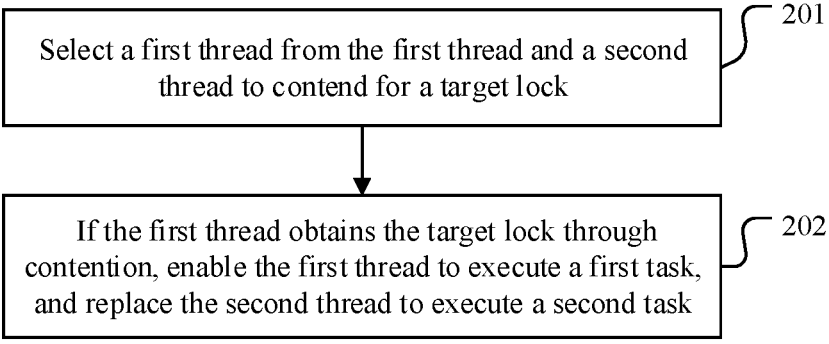
FIG. 2 is a schematic diagram of an embodiment of a method for accessing a critical resource according to this application.

To improve performance of the ARM processor, this application provides a method for accessing a critical resource. Refer to FIG. 2. An embodiment of the method for accessing a critical resource in this application may include the following steps.

201: Select a first thread from the first thread and a second thread to contend for a target lock.

A plurality of threads may be run. It is assumed that tasks to be executed by the plurality of threads correspond to a same lock and the tasks need to be executed in a mutually exclusive manner, the lock is referred to as the target lock. One thread may be selected from the plurality of threads to contend for the target lock. For ease of description, the selected thread is referred to as the first thread, and a task that is to be executed by the first thread and that corresponds to the target lock is referred to as a first task. A thread other than the first thread in the plurality of threads is referred to as the second thread, and a task that is to be executed by the second thread and that corresponds to the target lock is referred to as a second task. The second thread may correspond to a single thread, or may correspond to a plurality of threads. Different from the conventional technology in which both the first thread and the second thread need to contend for the target lock, in this embodiment of this application, only the first thread in the plurality of threads contends for the target lock, that is, one thread is determined from a thread group including the plurality of threads to contend for the target lock on behalf of the thread group. Other threads in the thread group may exit contention, for example, enter a sleep state.

202: If the first thread obtains the target lock through contention, enable the first thread to execute the first task, and replace the second thread to execute the second task.

If the first thread obtains the target lock through contention, different from the conventional technology in which the first thread executes only the first task of the first thread, the first thread executes the first task, and replaces the second thread to execute the second task.

It can be learned that, in the method for accessing a critical resource provided in this application, if n threads need to execute n tasks in the mutually exclusive manner, the n tasks can be completed by performing only one operation of contending for a lock. Compared with a conventional technology, this helps reduce a quantity of operations of contending for a lock and save computing resources. Although a single-core processing speed of an ARM processor is relatively low, and a quantity of threads running simultaneously is relatively large, performing the method provided in this embodiment of this application by the ARM processor helps save computing resources, and reduce impact of the operations of contending for a lock on performance of the ARM processor.

A type of the target lock is not limited in this embodiment of this application. For example, the target lock may be an exclusive lock or a spin lock. The exclusive lock helps reduce occupation of computing resources, and reduce impact of operations of contending for a lock on performance of a processor. Therefore, the exclusive lock is more suitable for the ARM processor.

In a possible implementation, to prevent the second thread from contending for the target lock when the second thread runs to the second task, the method in this embodiment of this application may further include the following step:

203: Block the second thread.

Blocking the second thread includes enabling the second thread to enter a sleep state.

For example, when a thread runs to a task corresponding to the target lock, if the thread is not selected as a thread contending for the target lock, the second thread may be blocked.

If the first thread replaces the second thread to complete execution of the second task, to enable the second thread to continue to perform a subsequent procedure, for example, obtain a new task for execution, the method in this embodiment of this application may further include the following step:

204: Unblock the second thread.

Unblocking the second thread includes waking up the second thread.

In a possible implementation, step 202 of enabling the first thread to execute the first task, and replace the second thread to execute the second task may specifically include the following steps:

2021: Enable the first thread to execute the second task based on an identifier that is of the second task and that is recorded in a data structure.

The identifier of the second task of the second thread may be recorded in the data structure. The data structure may be specifically a linked list, an array, a queue, or the like.

An identifier of a task is used to locate the task. For example, the identifier of the task may be an address of the task, or an address of the second task may be added to a thread descriptor of the second thread. The thread descriptor is a memory structure used to store thread information. In this case, the identifier of the task may be an address of the thread descriptor of the second thread.

When different tasks correspond to a same function, a thread may invoke a function of a same critical area when executing the different tasks. When the thread executes the different tasks, because content (referred to as task parameters) that is input to variables maintained in the critical area is different, the different tasks can be implemented. If the first task and the second task are tasks executed by using the function of the same critical area, the address of the second task may be specifically an address of a task parameter of the second task. If the first thread obtains the target lock through contention, the first thread may enter the critical area of the first thread by using the task parameter of the second task to execute the second task. A task in which a log is written into a buffer is used as an example. It is assumed that a function of a target critical area is writing content into the buffer. Variables maintained by the target critical area include an address of to-be-written content and a size of the buffer occupied by the to-be-written content (or a length of the to-be-written content). The first task and the second task are respectively used to write a first log fragment and a second log fragment into the buffer. A task parameter of the first task is an address of the first log fragment and a size of the buffer occupied by the first log fragment, and a task parameter of the second task is an address of the second log fragment and a size of the buffer occupied by the second log fragment. In this case, both the first thread and the second thread may execute the first task and the second task by invoking the function of the target critical area, except that task parameters written into the variables maintained by the target critical area when the target critical area runs are different. It can be learned that, the first thread may obtain the task parameter of the second task (that is, the address of the second log fragment and the size of the buffer occupied by the second log fragment) after obtaining the target lock; and then the first thread writes the second log fragment into the buffer by using the task parameter of the second task and a buffer-write function of the target critical area, in other words, the first thread replaces the second thread to execute the second task.

If the first thread obtains the target lock through contention, the first thread may be enabled to execute the second task based on the identifier that is of the second task and that is recorded in the data structure.

Step 2021 provides an implementation of "enabling the first thread to replace the second thread to execute the second task". This helps improve implementability of this embodiment of this application.

When a processor runs the method in this embodiment of this application, if a quantity of a plurality of threads corresponding to the first thread and the second thread is excessively large, time consumed in step 202 is excessively long, thread blocking duration is excessively long. Consequently, thread resources are wasted. To control the quantity of the plurality of threads, in a possible implementation, the plurality of threads may be threads that run, in a same time window, a task corresponding to the target lock. In other words, a moment at which the second thread runs to the second task and a moment at which the first thread runs to the first task are in the same time window. Moments at which the first thread and the second thread run to the task corresponding to the target lock are within the same time window, that is, the moment at which the first thread runs to the first task is adjacent to the moment at which the second thread runs to the second task. This helps reduce waiting duration of the first thread for the second thread, and improve efficiency of replacing the second thread to execute the second task by the first thread.

In a possible implementation, the time window may be preset. For example, a thread that first runs, within the preset time window, to the task corresponding to the target lock may be used as the first thread; and a thread that subsequently runs, within the time window, to the task corresponding to the target lock is used as the second thread. It is assumed that a preset time window includes 1 ms to 2 ms and 2 ms to 3 ms; and running threads, namely, a thread 1, a thread 2, a thread 3, a thread 4, and a thread 5 sequentially run to a task corresponding to the target lock at 1.1 ms, 1.5 ms, 2.2 ms, 2.5 ms, and 2.8 ms. In this case, the thread 1 and the thread 2 correspond to a same time window (1 ms to 2 ms), and the thread 3 to the thread 5 correspond to a same time window (2 ms to 3 ms). In this case, the thread 1 may be selected as the first thread to contend for the target lock. After obtaining the target lock through contention, the thread 1 executes a task of the thread 1 and a task the thread 2. The thread 3 may be selected as the first thread to contend for the target lock. After obtaining the target lock through contention, the thread 3 executes a task of the thread 3, a task of the thread 4, and a task of the thread 5.

In a possible implementation, assuming that a start moment of the time window may correspond to a moment at which the thread 1 runs to the task corresponding to the target lock, and preset duration is used as a width of the time window, the method in this embodiment of this application may be performed on the plurality of threads that run to the task corresponding to the target lock within the time window. After an end moment of the time window, a thread that first run to the task corresponding to the target lock starts another time window. The task corresponding to the target lock to which the thread runs corresponds to a start moment of the another time window, and preset duration is still used as a width of the another time window.

In a possible implementation, the end moment of the time window may correspond to a moment at which the first thread obtains the target lock through contention. In this case, the second task to be executed by the second thread corresponds to the target lock, and the second thread runs to the second task before the first thread obtains the target lock through contention.

In a possible implementation, the start moment of the time window may correspond to a moment at which the first thread runs to the first task, the end moment of the time window may correspond to a moment at which the first thread obtains the target lock through contention, and the width of the time window is determined based on duration in which the first thread obtains the lock through contention. In other words, in this embodiment of this application, a thread that first runs to the task corresponding to the target lock is selected as the first thread from a plurality of threads whose to-be-executed tasks correspond to the target lock.

In a possible implementation, step 201 may include the following steps:

2011: When the first thread runs to the first task, add a thread descriptor of the first thread to a first node of the data structure, and enable the first thread to contend for the target lock.

For example, when running the first task, the first thread may add the thread descriptor of the first thread to the first node of a data structure (for example, a linked list), and may locate the thread descriptor based on an identifier. Optionally, before the first thread adds the thread descriptor of the first thread to the first node of the data structure, the first thread may add the first task to the thread descriptor of the first thread.

2012: When the second thread runs to the second task, add the second task to a thread descriptor of the second thread, and then add the thread descriptor of the second thread to the data structure.

If the second thread runs to the second task, the second task of the second thread may be added to the thread descriptor of the second thread. For example, an address of the second task may be added to the thread descriptor of the second thread, and then the thread descriptor of the second thread may be added to a node of the foregoing data structure.

2013: If the first thread obtains the target lock through contention, enable a header pointer of the data structure to point to null, and record an address of the first node.

To limit a quantity of second threads, when the first thread obtains the target lock through contention, the data structure may be closed, and no new thread is added to the data structure. For example, if the data structure is a linked list, the first thread may release a header of the linked list, and delete each node in the linked list from the linked list. In this case, a thread descriptor subsequently added to the data structure is no longer associated with the first thread. For ease of searching for a thread descriptor stored in each deleted node, an address of a deleted node may be recorded. For a single linked list, an address of a first node needs to be recorded.

Step 2021 may specifically include the following steps:

20211: If the first thread obtains the target lock through contention, enable the first thread to search for, based on the recorded address of the first node, another node associated with the first thread.

20212: Enable the first thread to execute the second task based on a thread descriptor on the found node.

Figure 3:
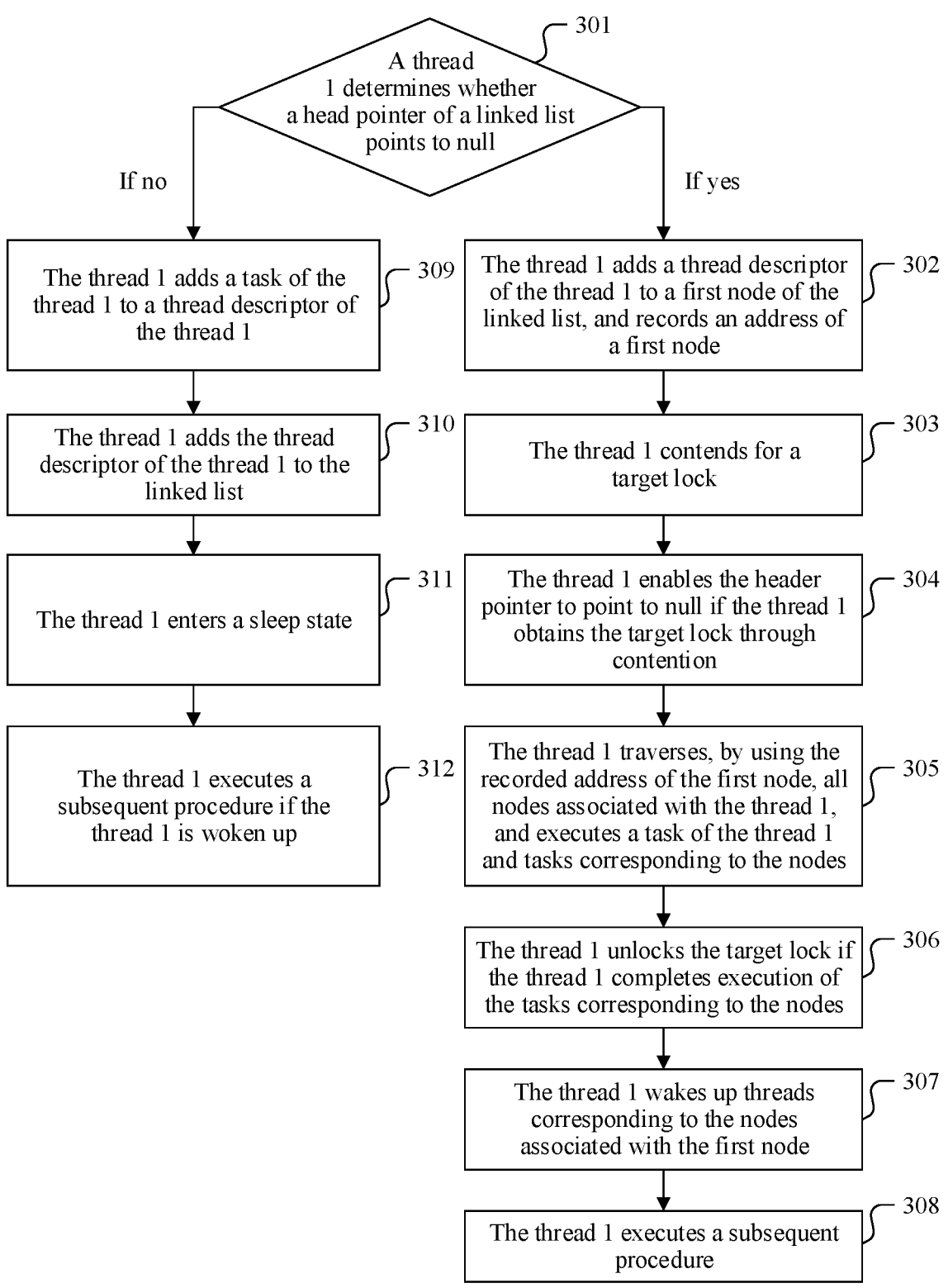
FIG. 3 is a schematic diagram of another embodiment of a method for accessing a critical resource according to this application.

The following describes the method for accessing a critical resource in this application from a perspective of a thread. It is assumed that a task to be executed by a thread 1 is to write content 1 into a buffer, and the task corresponds to a task 1 that needs to be executed by using the target lock. Refer to FIG. 3. Another embodiment of a method for accessing a critical resource according to this application may include the following steps.

301: A thread 1 determines whether a header pointer of a linked list points to null. If the header pointer of the linked list points to null, the thread 1 performs step 302; and if the header pointer of the linked list does not point to null, the thread 1 performs step 309.

302: If the header pointer points to null, the thread 1 adds a thread descriptor of the thread 1 to a first node of the linked list, and records an address of the first node.

Alternatively, the thread 1 adds only an identifier of a to-be-executed task to the first node.

303: The thread 1 contends for a target lock.

304: The thread 1 enables the header pointer to point to null if the thread 1 obtains the target lock through contention.

305: The thread 1 traverses, by using the recorded address of the first node, all nodes associated with the thread 1, and executes a task of the thread 1 and tasks corresponding to all the nodes.

Before step 302, the thread 1 may add the task of the thread 1 to the thread descriptor. In this case, the thread 1 may traverse, based on a thread descriptor of the first node and thread descriptors of other nodes associated with the first node, the task of the thread 1 and tasks corresponding to the other nodes.

306: The thread 1 unlocks the target lock if the thread 1 completes execution of the tasks corresponding to the nodes.

307: The thread 1 wakes up threads corresponding to the nodes associated with the first node.

308: The thread 1 executes a subsequent procedure.

309: If the header pointer points to non-null, the thread 1 adds a task of the thread 1 to the thread descriptor of the thread 1.

310: The thread 1 adds the thread descriptor of the thread 1 to the linked list.

311: The thread 1 enters a sleep state.

312: The thread 1 executes a subsequent procedure if the thread 1 is woken up.

After being woken up, the thread 1 may further delete the task that is added in step 309 from the thread descriptor of the thread 1.

The embodiment corresponding to FIG. 3 provides a possible specific implementation of the foregoing embodiment. In actual application, another specific implementation may be used to perform the method in the embodiments of this application.

Figure 4:
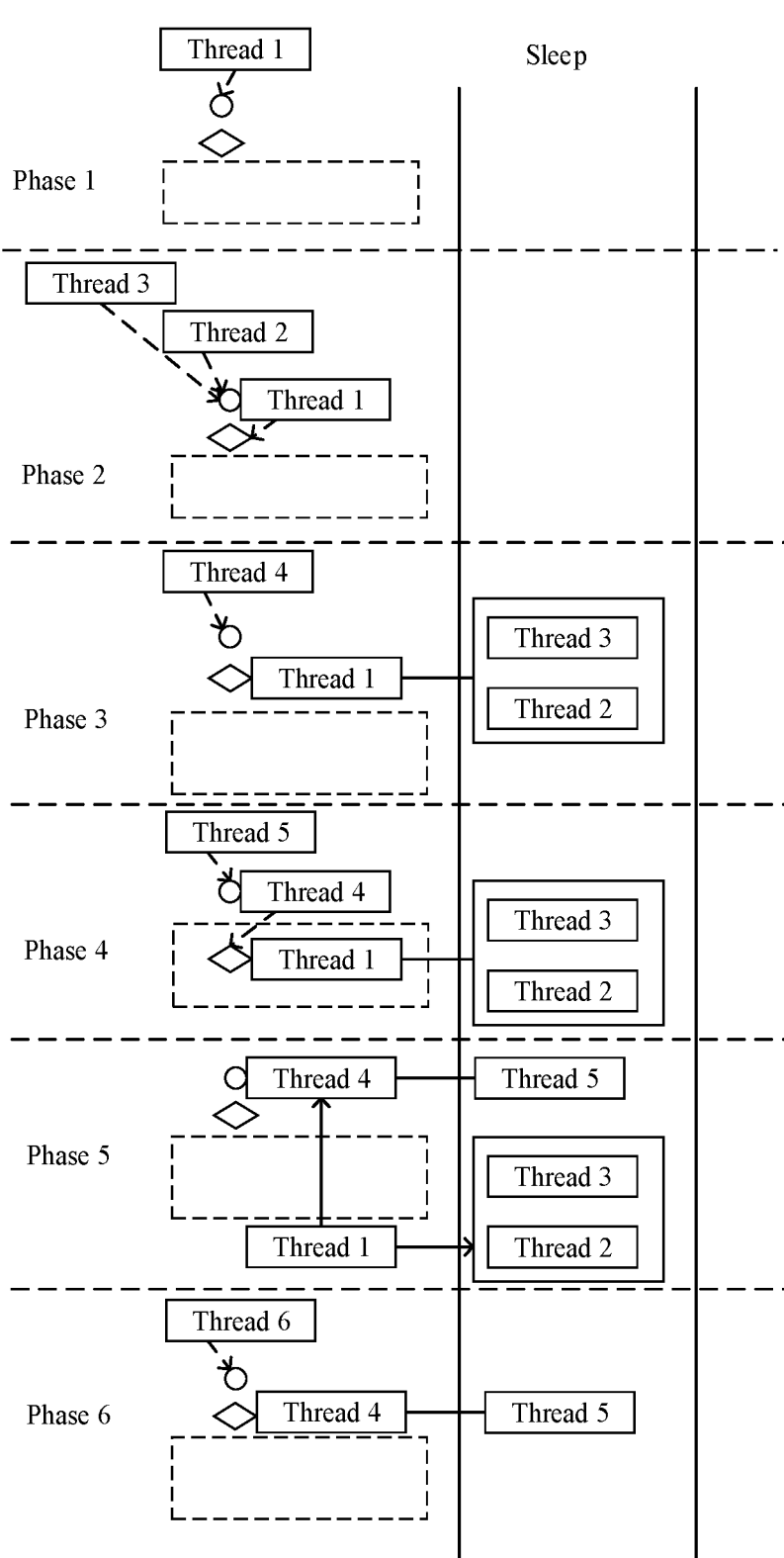
FIG. 4 is a schematic diagram of a process in which a plurality of threads access a same critical resource according to this application.

FIG. 4 is a schematic diagram of a process in which a plurality of threads access a same critical resource when the plurality of threads are run according to the method in the embodiment corresponding to FIG. 3. A rectangular block with dashed lines represents a target critical area or a target critical resource. A diamond block represents a lock of the target critical area or the target critical resource. A circle block represents a header pointer of a linked list corresponding to the lock. A thread connected to the circle block is a thread that enables the header pointer to point to a node corresponding to the lock. Refer to FIG. 4. The process in which the plurality of threads access the critical resource may include but is not limited to the following phases.

Phase 1: When running to a task 1 corresponding to a target lock, a thread 1 determines whether the header pointer of the linked list points to null, where a dashed line with an arrow in FIG. 4 represents the determining operation.

Phase 2: If the header pointer points to null, the thread 1 may write a thread descriptor of the thread 1 into a first node, and contend for the target lock. After the thread 1 writes the thread descriptor of the thread 1 into the first node, a thread 2 and a thread 3 respectively run to a task 2 and a task 3 corresponding to the target lock, and determine whether the header pointer points to null.

Phase 3: When the thread 1 contends for the lock, if the lock is free, the thread 1 may obtain the lock, and enable the header pointer to point to null. Because the first node to which the header pointer points is non-null, the thread 2 and the thread 3 respectively write the task 2 and the task 3 into a thread descriptor of the thread 2 and a thread descriptor of the thread 3, and then write the respective thread descriptors into the linked list. A node on which the thread 2 and the thread 3 perform the write operation is associated with the first node. A thread connected to a solid line without an arrow in FIG. 4 is a thread associated with a node on which a write operation is performed. After the thread 1 enables the header pointer to point to null, a thread 4 runs to a critical area of a task 4 corresponding to the target lock, and determines whether the header pointer points to null.

Phase 4: After obtaining the lock, the thread 1 may enter the target critical area, and execute the task 1, the task 2, and the task 3 by using a function of the target critical area. Because the thread 1 enables the header pointer to point to null, the thread 4 writes a thread descriptor of the thread 4 into the first node of the linked list and contends for the lock. After the thread 4 writes the thread descriptor of the thread 4 into the first node, a thread 5 runs to a task 5 corresponding to the target lock, and determines whether the header pointer points to null.

Phase 5: After executing each task by using the function of the target critical area, the thread 1 may unlock the lock, and wake up the thread 2 and the thread 3. If the lock is an exclusive lock, the thread 4 sleeps after the thread 4 does not obtain the lock through contention. Therefore, after unlocking the target lock, the thread 1 may further wake up the thread 4. When the thread 5 contends for a header of the linked list, because the thread 4 occupies the header, the thread 5 joins a group in which the thread 4 is the header of the linked list. A solid line with an arrow in FIG. 4 represents a wake-up operation.

Phase 6: The thread 1, the thread 2, and the thread 3 may continue to execute the code following the critical area. After thread 1 unlocks the lock, the thread 4 may obtain the lock through contention, and point the header pointer to null. After the thread 4 points the header pointer to null, a thread 6 runs to a task 6 corresponding to the target lock, and determines whether the header pointer points to null.

For understanding of a subsequent operation of the thread 4, refer to the operation of the foregoing thread 1. For understanding of a subsequent operation of the thread 5, refer to the operations of the thread 2 and the thread 3. Details are not described herein again.

In the foregoing application scenario, the thread 1 and the thread 4 both correspond to the first thread in the foregoing embodiment method, and the thread 2, the thread 3, and thread 5 all correspond to the second thread in the foregoing embodiment method.

In a possible implementation, the first task and the second task in the foregoing embodiment may be tasks for accessing a buffer of a NUMA system. For example, the first task and the second task may be used to write a redo log into a log buffer of the NUMA system.

Figure 5:
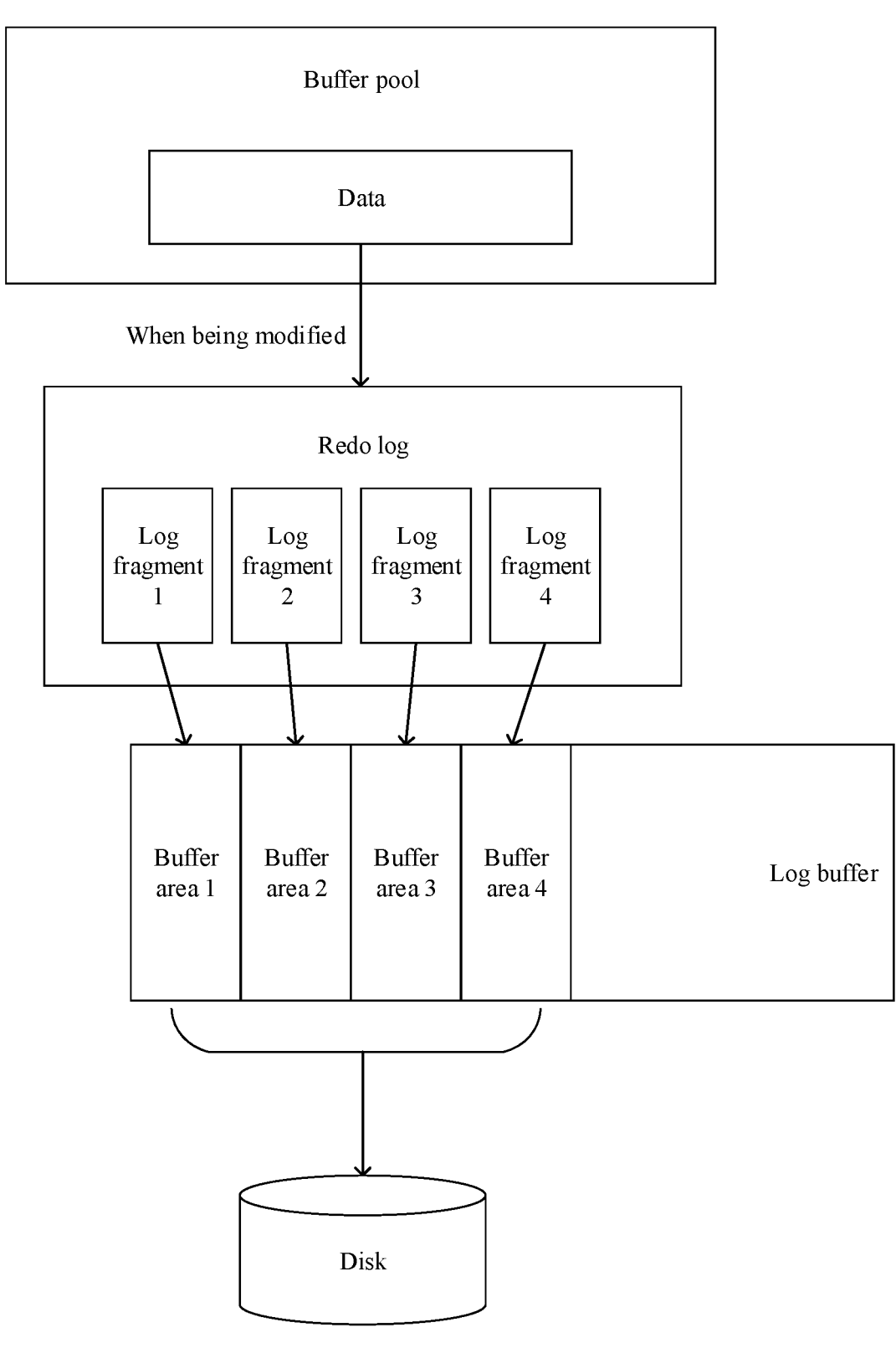
FIG. 5 is a schematic flowchart of recording a redo log.

A redo log (redo log) of a database is a file that records all changes made to the database. The redo log is credential for undoing transactions and recovering transactions in case of faults. Generally, a database system uses a write-ahead logging (write-ahead logging, WAL) mechanism to record redo logs to reduce input and output. WAL means that changes to a data file need to occur after the changes have been recorded in redo logs, that is, changes to a data file occur after log records that describe the changes to the data file are written into a disk. When the database system is faulty, the system can be recovered to a previous state based on the redo logs. FIG. 5 is a schematic flowchart of recording a redo log. When a change is made to data, the data is first loaded from a disk to a buffer pool (buffer pool), and the change is made in the buffer pool to generate a redo log. Write efficiency of a log buffer is a major factor that determines a throughput of a database. To improve the write efficiency of the redo log, a redo log buffer (redo log buffer) may be divided into a plurality of buffer areas; a plurality of threads run simultaneously, and different log fragments of the redo log are written into different buffer areas; and the redo log is then written into the disk from the log buffer. A plurality of non-overlapping buffer areas may be obtained through division in advance, or the plurality of buffer areas may be logically different buffer areas. A physical address corresponding to each buffer area may be dynamically allocated provided that the physical addresses of the buffer areas do not overlap. Different threads may invoke functions of a same critical area when executing a task of writing a log fragment into a buffer. The functions of the critical area may include: reserving a location (reserve space) for a buffer area and writing a log fragment into the reserved location. Reserving a location for a buffer area prevents different threads from writing log fragments into the same location in the log buffer.

Because shared resources corresponding to different buffer areas in the buffer do not affect each other, even if a same critical area is invoked when logs are written into different buffer areas, different locks, for example, WAL insert locks (WAL Insert Lock), may still be set for different buffer areas. When a thread needs to write a log fragment of a redo log into the buffer, a lock may be randomly selected from a plurality of locks for contention. After a lock is obtained through contention, the thread may write the log fragment into a buffer area corresponding to the selected lock.

An on-chip multi-core or many-core processor is a processor that a plurality of cores or many cores are integrated on a same chip. Compared with a conventional multiprocessor, the on-chip multi-core or many-core processor has advantages such as a high on-chip bandwidth, a short communication distance, and a high transmission speed, and therefore inter-thread data communication efficiency is higher. In addition, a kernel is split into a plurality of threads, and therefore a large quantity of threads can run simultaneously on a server including a plurality of on-chip multi-core or many-core processors. A non-uniform memory access (non-uniform memory access, NUMA) multiprocessor server is a system including independent NUMA nodes (briefly referred to as nodes) connected through a high-speed dedicated network. Each node includes a processor and a memory. The processor in the node may be a single CPU, an on-chip multi-core or many-core processor, or the like. The processor in the node is directly attached (attach) to the memory in the node, and accesses a memory of another node through a connection channel between nodes. Therefore, a speed for the processor in the node to access the memory in the node (local access) is much faster than a speed for the processor in the node to access the memory in the another node (remote access).

Figure 6:
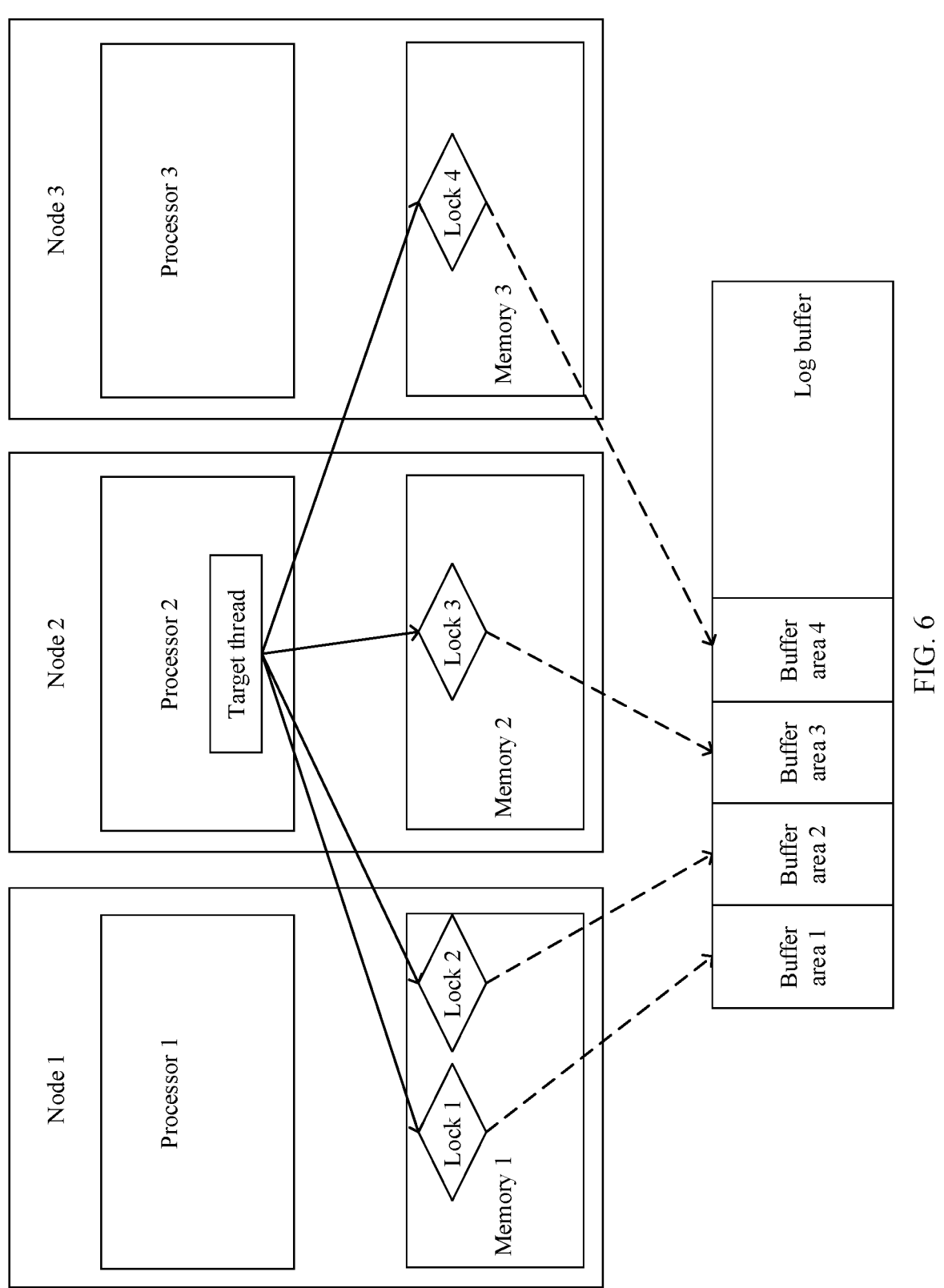
FIG. 6 is a schematic diagram of a process in which a thread writes a log fragment into a buffer in an existing NUMA system.

FIG. 6 is a schematic flowchart in which a thread writes a log fragment into a buffer in an existing NUMA system. Refer to FIG. 6. A log buffer is divided into a plurality of buffer areas. FIG. 6 shows four buffer areas (a buffer area 1 to a buffer area 4) of the log buffer. Four locks of the four buffer areas are loaded into memories of nodes of a server. For example, in FIG. 6, the server includes three nodes, a lock 1 and a lock 2 are stored on a node 1, a lock 3 is stored on a node 2, and a lock 4 is stored on a node 3. It is assumed that a target thread running on a processor 2 of the node 2 obtains a task of writing a log fragment of a redo log into a log buffer. The target thread first needs to randomly select a lock from the four locks for contention, and writes the log fragment into a buffer area corresponding to the selected lock after obtaining the lock through contention. It can be learned that for the NUMA system, it is likely that the target thread and a lock selected by the target thread from a plurality of locks loaded onto a plurality of nodes are located on different nodes. A process of contending for a lock is actually a process of operating a variable in the lock. The thread needs to contend for the lock through remote access, and consequently efficiency of contending for the lock is low.

Compared with an x86 processor, an ARM processor includes more cores. Therefore, a NUMA-based server with the ARM processor generally includes more nodes, and there is a higher probability that a lock randomly selected by a thread on a node is stored in a memory of another node. Therefore, there is a higher probability that the thread on the node contends for a lock in a remote access manner, and efficiency of writing redo logs into a buffer area is lower.

Figure 7:
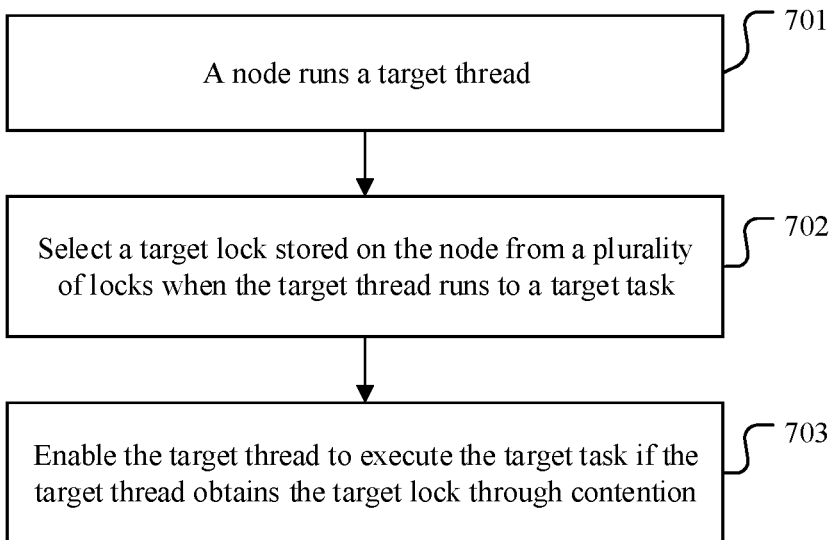
FIG. 7 is a schematic diagram of an embodiment of a method for accessing a critical resource in a NUMA system according to this application.

To improve efficiency of operations performed on a buffer, this application provides a method for accessing a critical resource in a NUMA system. The NUMA system may be a NUMA-based server. In this embodiment of this application, the critical resource may be a buffer. The NUMA system includes a plurality of nodes. The buffer of the NUMA system includes a plurality of buffer areas. Refer to FIG. 7. An embodiment of the method for accessing a critical resource in this application may include the following steps.

701: A node runs a target thread.

The NUMA system may schedule the target thread to the node for running.

702: Select a target lock stored on the node from a plurality of locks when the target thread runs to a target task.

The target task is used to access the buffer of the NUMA system. The buffer is a critical resource, and only a single thread is allowed to perform a write operation on the buffer at any moment. Because the buffer includes the plurality of buffer areas, usually one lock is set for each buffer area, and each lock corresponds to one buffer area. Only a thread that obtains the lock of the buffer area can perform operations on the buffer area. The NUMA system loads a lock of each buffer area to the node in the NUMA system. When the target thread runs to the target task, the node selects a lock stored on the node from the plurality of locks in the method in this embodiment of this application, where the lock is referred to as the target lock. This is different from a conventional technology in which the node randomly selects a lock from the plurality of locks.

If the node identifies one target lock, the node may select the target lock for contention by threads. If the node identifies a plurality of target locks, the node may select one target lock from the plurality of target locks, for contention between threads. If the node identifies no target lock, the node may select a lock from the plurality of locks in another manner for contention between threads. For example, the node may randomly select one lock from the plurality of locks, for contention between threads. An operation performed by the node in this case is not limited in this embodiment of this application.

703: Enable the target thread to execute the target task if the target thread obtains the target lock through contention.

For example, the node may enable the target thread to write a log fragment of a redo log into a buffer area corresponding to the target lock. After completing execution of the target task, the target thread may unlock the target lock.

In the method for accessing a critical resource in this application, when a thread running on the node needs to access one of the plurality of buffer areas, the node may select, from the plurality of locks that protect the plurality of buffer areas, the target lock stored on the node. If there is the target lock on the node, the thread contends for the target lock. Compared with the conventional technology, the method provided in this embodiment of this application helps increase a probability that the thread on the node contends for a lock on the node. Therefore, a probability that the thread on the node contends for the lock through local access is higher, and efficiency of accessing a buffer area is higher, thereby helping improve performance of an ARM processor.

To improve a probability that a thread selects the target lock, in a possible implementation, a plurality of locks may be distributed to nodes in the NUMA system. For example, a hash value of an identifier of each node and a hash value of an identifier of each lock may be calculated according to a distributed hash algorithm. Then the plurality of locks are evenly distributed to the plurality of nodes in the NUMA system based on the hash value of the identifier of each node and the hash value of the identifier of each lock. Alternatively, for example, it is assumed that there are four NUMA nodes which are numbered, by a system, as a node 0 to a node 3, and 20 locks which are numbered as a lock 0 to a lock 19. A hash rule is: A remainder of a lock number divided by 4 is used as a number of a NUMA node that stores the lock. For example, a lock numbered 5 is stored on the NUMA node 1, and a lock numbered 18 is stored on a NUMA node 2. In this way, the plurality of locks are evenly distributed on the nodes.

In a possible implementation, a correspondence between a lock and a node on which the lock is located may be recorded, where the correspondence is used when the plurality of locks are distributed to the plurality of nodes. The correspondence may also refer to a method used to determine the correspondence.

In a possible implementation, step 702 may specifically include the following step:

7021: Select the target lock from the plurality of locks based on the correspondence.

The target lock may be selected from the plurality of locks based on the correspondence between the lock and the node, where the locks are distributed based on the correspondence.

Figure 8:
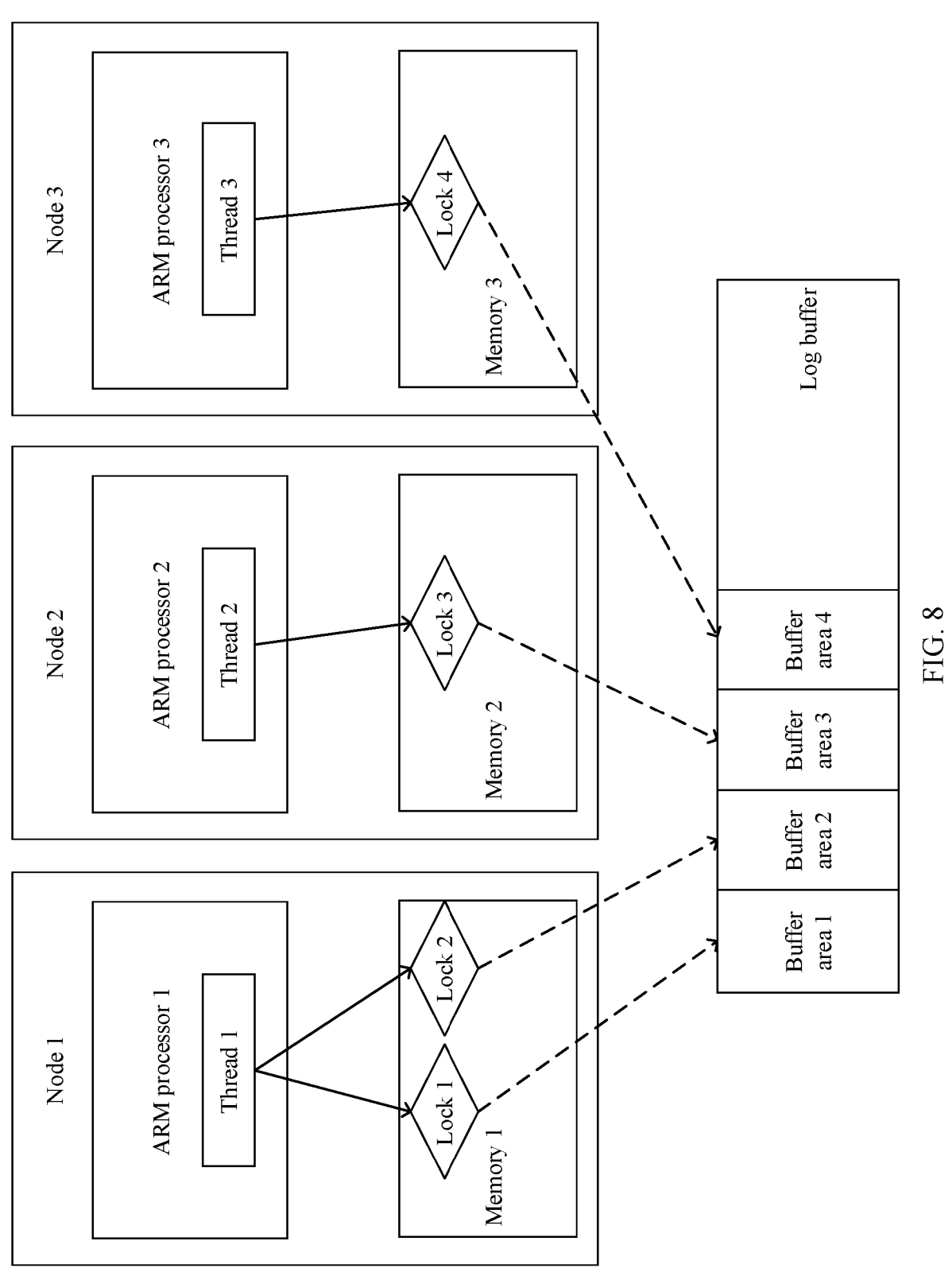
FIG. 8 is a schematic diagram of a process in which a thread writes a log fragment into a buffer in a NUMA system according to this application.

FIG. 8 is a schematic diagram of a process in which a thread writes a log fragment into a log buffer in a NUMA system according to this application. For example, a processor in the NUMA system node is an ARM processor.

Refer to FIG. 8. The log buffer is divided into four buffer areas (a buffer area 1 to a buffer area 4). Four locks of the four buffer areas are loaded into memories of a plurality of nodes of a server. For example, in FIG. 8, the server includes three nodes, a lock 1 and a lock 2 are stored on a node 1, a lock 3 is stored on a node 2, and a lock 4 is stored on a node 3. A thread 1 running in a processor 1 of the node 1 selects a target lock on the node 1 from the four locks. Both the lock 1 and the lock 2 are target locks corresponding to the thread 1. The thread 1 may select a lock from the lock 1 and the lock 2 for contention. After the selected lock is obtained through contention, the thread 1 writes a log fragment into a buffer area corresponding to the lock. A thread 2 running in a processor 2 of the node 2 selects a target lock on the node 2 from the four locks, that is, the lock 3. The thread 2 may contend for the lock 3, to write a log fragment into a buffer area 3 corresponding to the lock 3. A thread 3 running in a processor 3 of the node 3 selects a target lock on the node 3 from the four locks, that is, the lock 4. The thread 3 may contend for the lock 4, to write a log fragment into the buffer area 4 corresponding to the lock 4. It can be learned that for the NUMA system, a target thread selects, from the plurality of locks loaded onto the plurality of nodes, a lock on a node in which the lock is located. This is favorable to enabling the thread on the node to contend for the lock through local access, thereby improving efficiency of contending for the lock.

The following describes a method for accessing a critical resource by a plurality of threads running on a node.

It is assumed that a plurality of threads, for example, a first thread and a second thread, run on a node. Refer to FIG. 9. Another embodiment of a method for accessing a critical resource in a NUMA system in this application may include the following steps.

901: A node runs the first thread and the second thread.

A first task to be executed by the first thread and a second task to be executed by the second thread are used to access a buffer of a NUMA system.

902: The node selects a target lock stored on the node from a plurality of locks.

When the first thread runs to the first task, a lock stored on the node is selected from the plurality of locks. A target task is used to access a buffer of the NUMA system. The buffer includes a plurality of buffer areas, and each of the plurality of locks corresponds to one buffer area. When the second thread runs to the second task, a lock stored on the node is selected from the plurality of locks. The first task and the second task correspond to a same lock, which is referred to as the target lock.

903: The node selects the first thread from the first thread and the second thread to contend for the target lock.

904: If the first thread obtains the target lock through contention, enable the first thread to execute the first task, and replace the second thread to execute the second task.

For steps in the embodiment corresponding to FIG. 9, refer to descriptions of corresponding steps in the foregoing embodiments of this application. Details are not described herein again. For example, for step 901 and step 902, refer to related descriptions of step 701 and step 702 in the embodiment corresponding to FIG. 7. For step 903 and step 904, refer to related descriptions of step 201 and step 202 in the embodiment corresponding to FIG. 2.

The following describes the method for accessing a critical resource in this application from a perspective of a thread.

Figure 10:
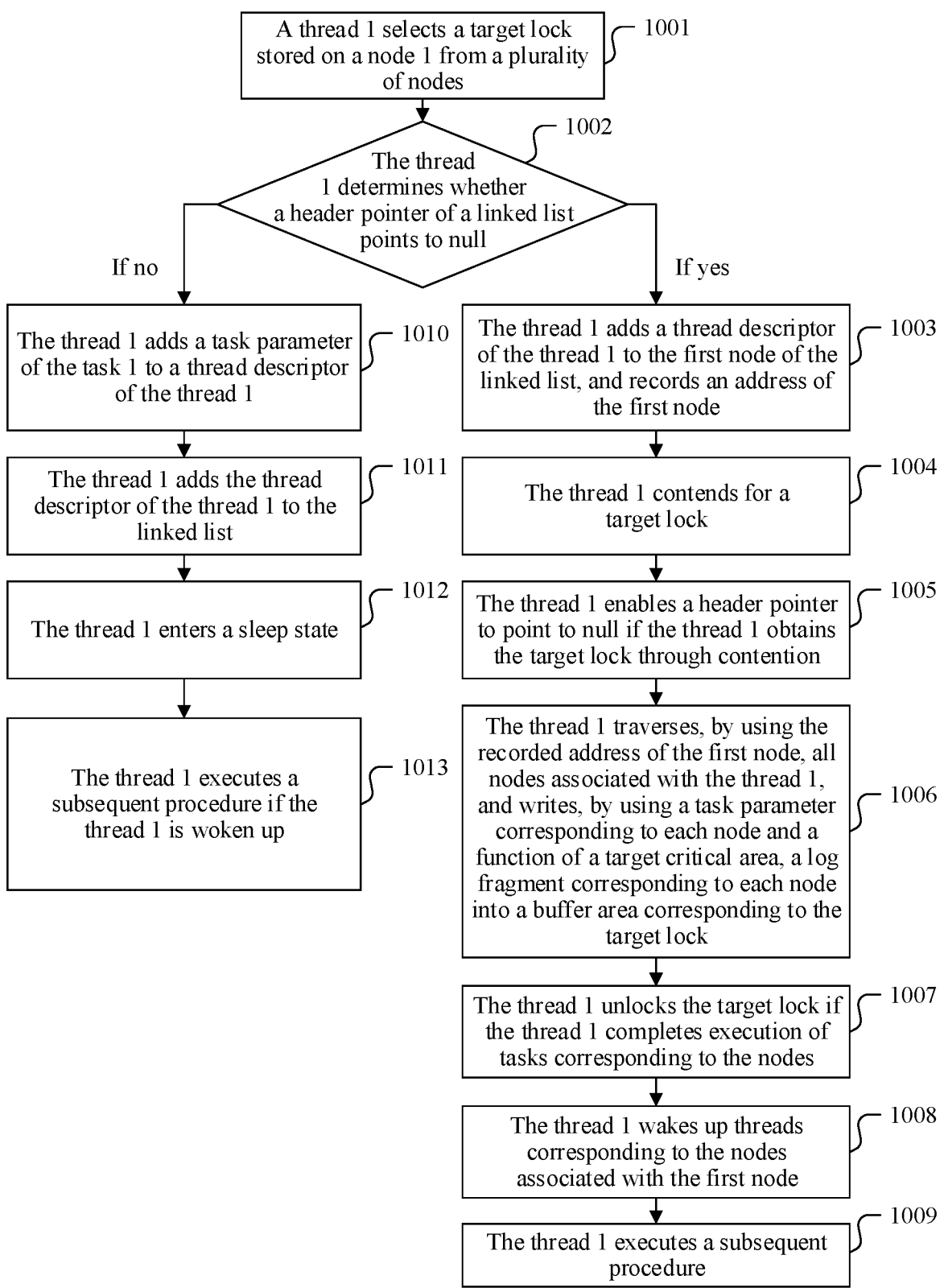
FIG. 10 is a schematic diagram of another embodiment of a method for accessing a critical resource in a NUMA system according to this application.

It is assumed that a thread 1 runs on a node 1; a task 1 to be executed by the thread 1 is to invoke a function of a target critical area to write a log fragment 1 into a buffer; an address of the log fragment 1 and a size of an occupied buffer (briefly referred to as task parameters of the task 1) are stored in stack space of the thread 1; a buffer of a NUMA system includes a plurality of buffer areas; each buffer area corresponds to one lock; and a plurality of locks are distributed on a plurality of nodes in the NUMA system. Refer to FIG. 10. Another embodiment of a method for accessing a critical resource in a NUMA system in this application may include the following steps.

1001: A thread 1 selects a target lock stored on a node 1 from a plurality of nodes.

1002: The thread 1 determines whether a header pointer of a linked list corresponding to the target lock points to null. If the header pointer of the linked list corresponding to the target lock points to null, the thread 1 performs step 1003. If the header pointer of the linked list corresponding to the target lock does not point to null, the thread 1 performs step 1010.

1003: If the header pointer points to null, the thread 1 adds a thread descriptor of the thread 1 to the first node of the linked list, and records an address of the first node.

Alternatively, the thread 1 may add only a task parameter of the task 1 to the first node.

1004: The thread 1 contends for the target lock.

1005: The thread 1 enables the header pointer to point to null if the thread 1 obtains the target lock through contention.

1006: The thread 1 traverses, by using the recorded address of the first node, all nodes associated with the thread 1, and writes, by using a task parameter corresponding to each node and a function of a target critical area, a log fragment corresponding to each node into a buffer area corresponding to the target lock.

1007: The thread 1 unlocks the target lock if the thread 1 completes execution of tasks corresponding to the nodes.

1008: The thread 1 wakes up threads corresponding to the nodes associated with the first node.

1009: The thread 1 executes a subsequent procedure.

1010: If the header pointer points to non-null, the thread 1 adds a task parameter of the task 1 to a thread descriptor of the thread 1.

1011: The thread 1 adds the thread descriptor of the thread 1 to the linked list.

1012: The thread 1 enters a sleep state.

1013: The thread 1 executes a subsequent procedure if the thread 1 is woken up.

The foregoing method is executed by an apparatus for accessing a critical resource. To implement the foregoing functions, the apparatus for accessing a critical resource includes a corresponding hardware structure and/or software module for performing each function. A person skilled in the art should easily be aware that, in combination with the functions described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of functional modules, division into the functional module may be performed on an apparatus for accessing a critical resource in this application according to the foregoing method embodiments. For example, each functional module may be obtained through division corresponding to each function, or two or more functions may be integrated into one functional module. The integrated functional module may be implemented in a form of hardware, or may be implemented in a form of a software function unit.

Figure 11:
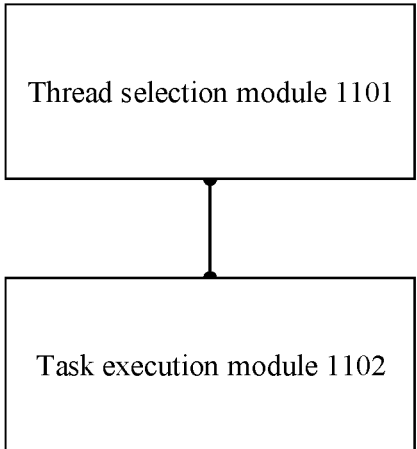
FIG. 11 is a schematic diagram of an embodiment of an apparatus for accessing a critical resource according to this application.

For example, when functional units are obtained through integration, FIG. 11 is a schematic structural diagram of an apparatus for accessing a critical resource. As shown in FIG. 11, an embodiment of the apparatus for accessing a critical resource in this application may include:

a thread selection module 1101, configured to select a first thread from the first thread and a second thread to contend for a target lock, where a first task to be executed by the first thread and a second task to be executed by the second thread correspond to the target lock; and a task execution module 1102, configured to: if the first thread selected by the thread selection module 1101 obtains the target lock through contention, enable the first thread to execute the first task, and replace the second thread to execute the second task.

In some embodiments of this application, the task execution module is specifically configured to enable the first thread to execute the second task based on an identifier that is of the second task and that is recorded in a data structure.

In some embodiments of this application, the second thread is a thread that runs to the second task before the first thread obtains the target lock through contention.

In some embodiments of this application, a moment at which the first thread runs to the first task is earlier than a moment at which the second thread runs to the second task.

Figure 12:
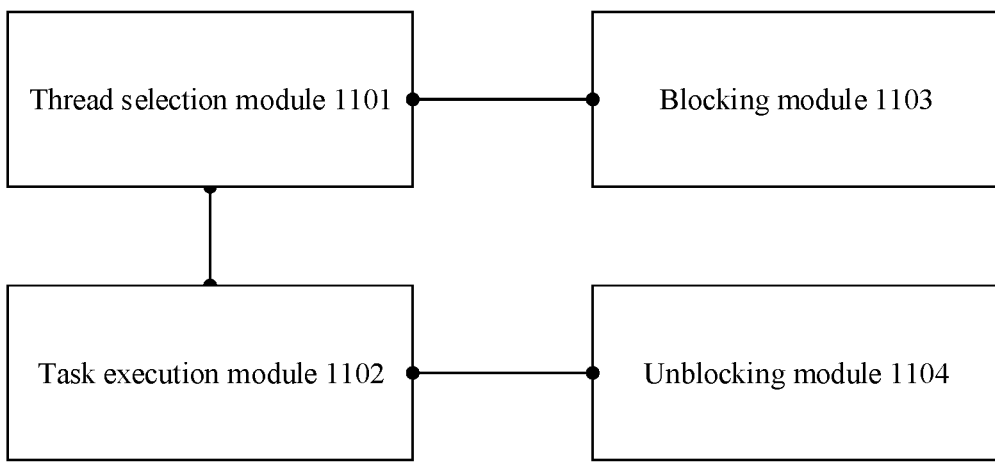
FIG. 12 is a schematic diagram of another embodiment of an apparatus for accessing a critical resource according to this application.

Refer to FIG. 12. In some embodiments of this application, the apparatus further includes a blocking module 1103, configured to block the second thread.

Still refer to FIG. 12. In some embodiments of this application, the apparatus further includes an unblocking module 1104, configured to unblock the second thread if the first thread replaces the second thread to complete execution of the second task.

In some embodiments of this application, the first thread and the second thread are threads running on a same target node of a NUMA system. The first task and the second task are used to access a buffer of the NUMA system. The buffer includes a plurality of buffer areas, and each buffer area corresponds to one lock. The NUMA system includes a plurality of nodes. Locks corresponding to the plurality of buffer areas are stored on the nodes in the NUMA system. The target lock is stored on the target node.

Figure 13:
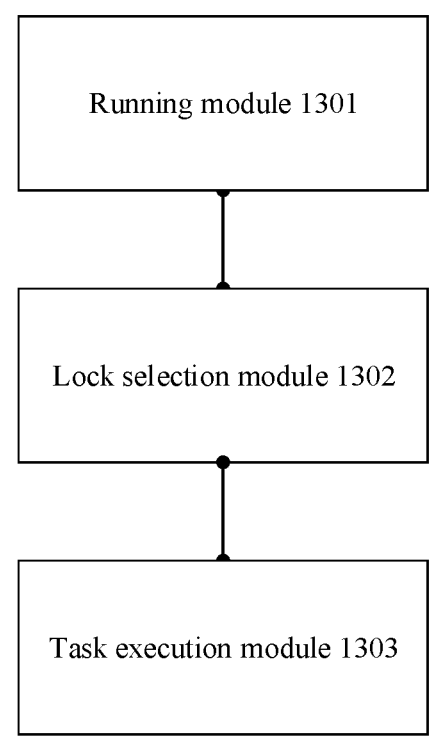
FIG. 13 is a schematic diagram of another embodiment of an apparatus for accessing a critical resource according to this application.

FIG. 13 is another schematic structural diagram of an apparatus for accessing a critical resource. As shown in FIG. 13, the apparatus for accessing a critical resource is disposed on a node of a NUMA system. An embodiment of the apparatus for accessing a critical resource in this application may include:

a running module 1301, configured to run a target thread;

a lock selection module 1302, configured to: when the target thread runs to a target task, select, from a plurality of locks, a target lock stored on the node. The target task is used to access a buffer of the NUMA system. The buffer includes a plurality of buffer areas, and each of the plurality of locks corresponds to one buffer area; and a task execution module 1303, configured to enable the target thread to execute the target task if the target thread obtains the target lock through contention.

Figure 14:
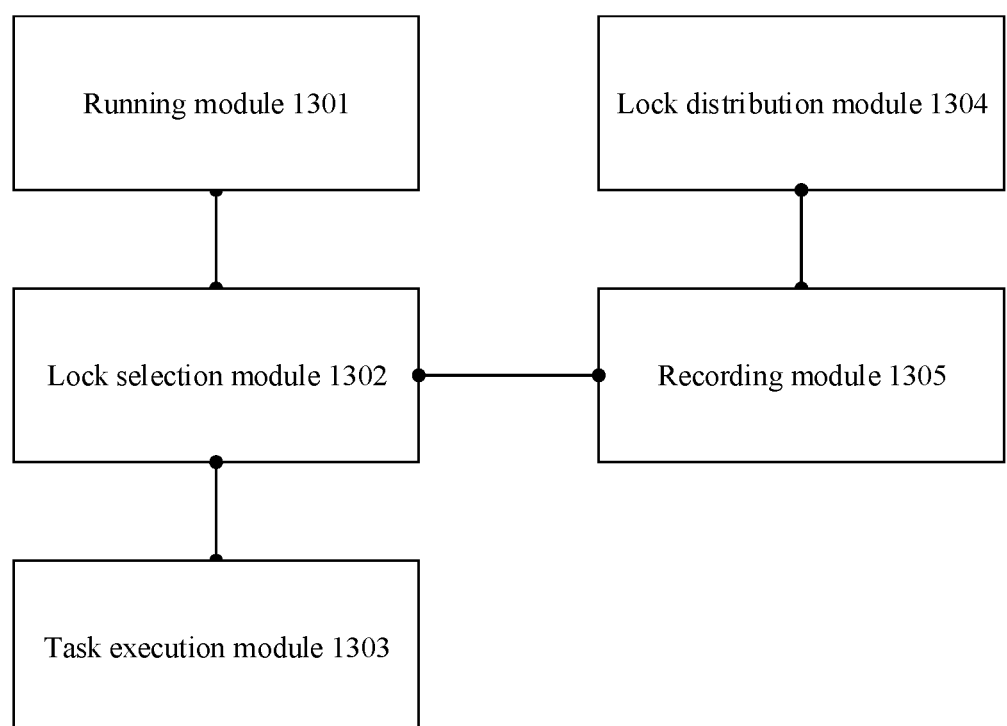
FIG. 14 is a schematic diagram of another embodiment of an apparatus for accessing a critical resource according to this application.

Refer to FIG. 14. In some embodiments of this application, the apparatus further includes a lock distribution module 1304, configured to distribute the plurality of locks to a plurality of nodes in the NUMA system.

Still refer to FIG. 14. In some embodiments of this application, the apparatus further includes a recording module 1305, configured to record a correspondence between each of the plurality of locks and a node on which each lock is located.

In some embodiments of this application, the lock selection module 1302 is specifically configured to select the target lock from the plurality of locks based on the correspondence.

The apparatus embodiments corresponding to FIG. 11 to FIG. 14 may be understood with reference to related parts in the foregoing method embodiments, and details are not described herein again.

Figure 15:
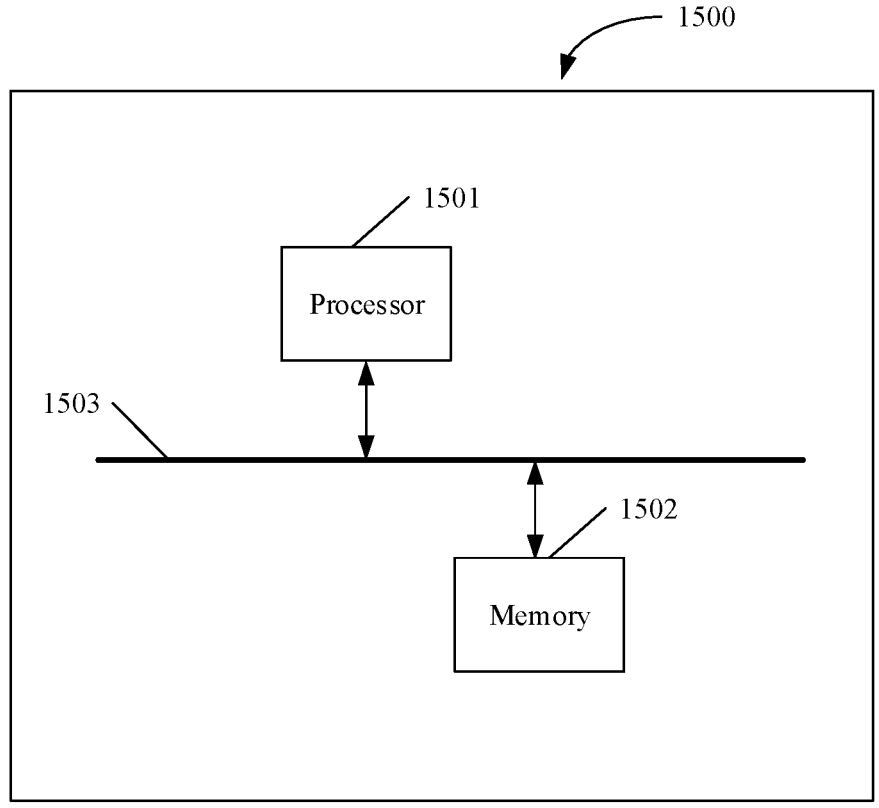
FIG. 15 is a schematic diagram of an embodiment of a computer device according to this application.

The foregoing "module" herein may be an application-specific integrated circuit (application-specific integrated circuit, ASIC), a processor and a memory for executing one or more software or firmware programs, an integrated logic circuit, and/or another device that can provide the foregoing functions. FIG. 15 is a schematic structural diagram of hardware of a computer device 1500. In a simple embodiment, a person skilled in the art may figure out an apparatus for accessing a critical resource in a form shown in FIG. 15.

The computer device 1500 includes at least one processor 1501 and a memory 1502.

The processor 1501 may be a central processing unit (central processing unit, CPU), a network processor (network processor, NP), a combination of a CPU and an NP, a digital signal processor (digital signal processor, DSP), an application-specific integrated circuit (application specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in this application. The general-purpose processor may be a microprocessor, or the processor may be any conventional processor or the like. Steps of the methods disclosed in this application may be directly executed and completed by using a hardware decoding processor, or may be executed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. Although only one processor is shown in the figure, the apparatus may include a plurality of processors, or the processor includes a plurality of processing units. Specifically, the processor may be a single-core processor, or may be a multi-core processor or a many-core processor. The processor may be an ARM processor.

The memory 1502 is configured to store computer instructions executed by the processor. The memory 1502 may be a storage circuit or a memory. The memory 1502 may be a volatile memory or a non-volatile memory, or may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. The memory 1502 may be independent of the processor 1501. In a possible implementation, the processor 1501 and the memory 1502 may be connected to each other through a bus 1503. The bus 1503 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. Alternatively, the memory 1502 may be a storage unit in the processor 1501, and is directly attached (attach) to the processor 1501. This is not limited herein. Although only one memory 1502 is shown in the figure, the apparatus may alternatively include a plurality of memories 1502, or the memory 1502 includes a plurality of storage units.

The memory 1502 is configured to store computer executable instructions for performing the solutions of this application, and the processor 1501 controls execution. The processor 1501 is configured to execute the computer executable instructions stored in the memory 1502, to implement the method for accessing a critical resource provided in the foregoing method embodiments of this application.

In a possible implementation, the computer executable instructions in this embodiment of this application may also be referred to as application program code. This is not specifically limited in this embodiment of this application.

The computer device may be a server, or in some embodiments (for example, the embodiments corresponding to FIG. 7 to FIG. 10) may be a NUMA system, or more specifically, may be a node of the NUMA system.

All or some of the foregoing embodiments may be implemented by using software, hardware, firmware, or any combination thereof. When the software is used for implementation, all or some of the embodiments may be implemented in a form of a computer program product.

The computer program product includes one or more computer instructions. When the computer executable instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device. In the embodiments of this application, "a plurality of" means two or more.

In the embodiments of this application, the term such as "example" or "for example" is used to represent giving an example, an illustration, or descriptions. Any embodiment or design solution described by using "example" or "for example" in the embodiments of this application shall not be construed as being more preferred or more advantageous than another embodiment or design solution. Exactly, use of the word such as "example" or "for example" is intended to present a related concept in a specific manner.

In the embodiments of this application, for ease of understanding, a plurality of examples are used for description. However, these examples are merely examples, but this does not mean that these examples are optimal implementations for implementing this application.

The technical solutions provided in this application are described in detail above. The principle and implementation of this application are described herein through specific examples. The description about the embodiments is merely provided to help understand the method and core ideas of this application. In addition, a person of ordinary skill in the art can make variations to the specific implementations and application scopes according to the idea of this application. Therefore, the content of specification shall not be construed as any limit to this application.

What is claimed is:

1. A method for accessing a critical resource, comprising:
   selecting a first thread from the first thread and a second thread to contend for a target lock, wherein a first task to be executed by the first thread and a second task to be executed by the second thread correspond to the target lock; and
   when the first thread obtains the target lock through contention, enabling the first thread to execute the first task, and to replace the second thread to execute the second task, wherein the enabling the first thread to replace the second thread to execute the second task comprises:
   executing, by the first thread, the second task based on an identifier that is of the second task and that is recorded in a data structure, wherein the identifier is an address of a task parameter of the second task, and wherein the task parameter comprises a size of a buffer occupied by a second log fragment for the second task.

2. The method according to claim 1, wherein the second thread is a thread that runs to the second task before the first thread obtains the target lock through contention.

3. The method according to claim 1, wherein a moment at which the first thread runs to the first task is earlier than a moment at which the second thread runs to the second task.

4. The method according to claim 1, wherein the method further comprises:
   blocking the second thread.

5. The method according to claim 4, wherein the method further comprises:
   unblocking the second thread when the first thread replaces the second thread to complete execution of the second task.

6. The method according to claim 1, wherein the first thread and the second thread are threads running on a same node of a non-uniform memory access (NUMA) system, the first task and the second task are used to access a buffer of the NUMA system, the buffer comprises a plurality of buffer areas, each buffer area corresponds to one lock, locks corresponding to the plurality of buffer areas are stored on a plurality of nodes in the NUMA system, and the target lock is a lock stored on the node.

7. A method for accessing a critical resource in a non-uniform memory access (NUMA) system, wherein the method comprises:

running, by a node in the NUMA system, a target thread;

when the target thread runs to a target task, selecting, from a plurality of locks, a target lock stored on the node, wherein the target task is used to access a buffer of the NUMA system, the buffer comprises a plurality of buffer areas, and each of the plurality of locks corresponds to one buffer area, wherein the selecting, from the plurality of locks, the target lock stored on the node further comprises:

determining. based on a correspondence between each of the plurality of locks and a respective node on which the corresponding lock is located, that a particular lock is stored on the same node that runs the target thread, wherein the correspondence is determined based on a hash value of an identifier of each of the plurality of locks and a hash value of a respective node, and the plurality of locks are evenly distributed to a plurality of nodes in the NUMA system based on the hash value of the identifier of each of the plurality of locks and the hash value of each of the plurality of nodes in the NUMA system; and selecting the particular lock as the target lock based on the determining; and enabling the target thread to execute the target task when the target thread obtains the target lock through contention.

8. The method according to claim 7, wherein the method further comprises:

distributing the plurality of locks to a plurality of nodes in the NUMA system.

9. The method according to claim 8, wherein the method further comprises:

recording the correspondence between each of the plurality of locks and a node on which each lock is located.

10. An apparatus for accessing a critical resource, comprising:

at least one processor; and one or more memories coupled to the at least one processor and storing programming instructions for execution by the at least one processor to cause the apparatus to:

select a first thread from the first thread and a second thread to contend for a target lock, wherein a first task to be executed by the first thread and a second task to be executed by the second thread correspond to the target lock; and when the first thread obtains the target lock through contention, enable the first thread to execute the first task, and to replace the second thread to execute the second task, wherein the enabling the first thread to replace the second thread to execute the second task comprises:

executing, by the first thread, the second task based on an identifier that is of the second task and that is recorded in a data structure, wherein the identifier is an address of a task parameter of the second task, and wherein the task parameter comprises a size of a buffer occupied by a second log fragment for the second task.

11. The apparatus according to claim 10, wherein the second thread is a thread that runs to the second task before the first thread obtains the target lock through contention.

12. The apparatus according to claim 10, wherein a moment at which the first thread runs to the first task is earlier than a moment at which the second thread runs to the second task.

13. The apparatus according to claim 10, wherein the programming instructions, when executed by the at least one processor, cause the apparatus to block the second thread.

14. The apparatus according to claim 13, wherein the programming instructions, when executed by the at least one processor, cause the apparatus to unblock the second thread when the first thread replaces the second thread to complete execution of the second task.

15. The apparatus according to claim 10, wherein the first thread and the second thread are threads running on a same target node of a non-uniform memory access (NUMA) system, the first task and the second task are used to access a buffer of the NUMA system, the buffer comprises a plurality of buffer areas, each buffer area corresponds to one lock, the NUMA system comprises a plurality of nodes, locks corresponding to the plurality of buffer areas are stored on the plurality of nodes in the NUMA system, and the target lock is a lock stored on the target node.

16. An apparatus for accessing a critical resource in a non-uniform memory access (NUMA) system, wherein the apparatus is disposed on a node in the NUMA system, and the apparatus comprises:

at least one processor; and one or more memories coupled to the at least one processor and storing programming instructions for execution by the at least one processor to cause the apparatus to:

run a target thread;

when the target thread runs to a target task, select, from a plurality of locks, a target lock stored on the node, wherein the target task is used to access a buffer of the NUMA system, the buffer comprises a plurality of buffer areas, and each of the plurality of locks corresponds to one buffer area, wherein the selecting, from the plurality of locks, the target lock stored on the node further comprises:

determining. based on a correspondence between each of the plurality of locks and a respective node on which the corresponding lock is located, that a particular lock is stored on the same node that runs the target thread, wherein the correspondence is determined based on a hash value of an identifier of each of the plurality of locks and a hash value of a respective node, and the plurality of locks are evenly distributed to a plurality of nodes in the NUMA system based on the hash value of the identifier of each of the plurality of locks and the hash value of each of the plurality of nodes in the NUMA system; and selecting the particular lock as the target lock based on the determining; and enable the target thread to execute the target task when the target thread obtains the target lock through contention.

17. The apparatus according to claim 16, wherein the programming instructions, when executed by the at least one processor, cause the apparatus to distribute the plurality of locks to a plurality of nodes in the NUMA system.

18. The apparatus according to claim 17, wherein the programming instructions, when executed by the at least one processor, cause the apparatus to record the correspondence between each of the plurality of locks and a node on which each lock is located.

19. A non-uniform memory access (NUMA) system, wherein the NUMA system comprises a plurality of nodes and a plurality of buffer areas, each buffer area corresponds to one lock, and a plurality of locks corresponding to the plurality of buffer areas are stored on the plurality of nodes in the NUMA system; and a target node of the NUMA system comprises
at least one processor; and
one or more memories coupled to the at least one processor and storing programming instructions for execution by the at least one processor to cause the target node to:
run a first thread, and select a target lock stored on the target node from the plurality of locks when the first thread runs to a to-be-executed first task, wherein the first task is used to access the buffer of the NUMA system, wherein the selecting, from the plurality of locks, the target lock stored on the node further comprises:
determining. based on a correspondence between each of the plurality of locks and a respective node on which the corresponding lock is located, that a particular lock is stored on the same node that runs the target thread, wherein the correspondence is determined based on a hash value of an identifier of each of the plurality of locks and a hash value of a respective node, and the plurality of locks are evenly distributed to a plurality of nodes in the NUMA system based on the hash value of the identifier of each of the plurality of locks and the hash value of each of the plurality of nodes in the NUMA system; and
selecting the particular lock as the target lock based on the determining.

20. The NUMA system according to claim 19, wherein the plurality of locks are evenly distributed on the plurality of nodes in the NUMA system.

21. The NUMA system according to claim 19, wherein the programming instructions, when executed by the at least one processor, cause the target node to run a second thread, select a target lock stored on the target node from the plurality of locks when the second thread runs to a to be executed second task, and the second task is used to access a buffer of the NUMA system; and
select the first thread from the first thread and the second thread to contend for the target lock, and when the first thread obtains the target lock through contention, enable the first thread to execute the first task, and to replace the second thread to execute the second task.

22. The NUMA system according to claim 21, wherein the programming instructions, when executed by the at least one processor, cause the target node to enable the first thread to execute the second task based on an identifier that is of the second task and that is recorded in a data structure.

23. The NUMA system according to claim 21, wherein the second thread is a thread that runs to the second task before the first thread obtains the target lock through contention.

24. The NUMA system according to claim 21, wherein a moment at which the first thread runs to the first task is earlier than a moment at which the second thread runs to the second task.

25. The NUMA system according to claim 21, wherein the programming instructions, when executed by the at least one processor, cause the target node to block the second thread, and unblock the second thread when the first thread replaces the second thread to complete execution of the second task.

* * * * *